(12) United States Patent
Komura et al.

(10) Patent No.: US 10,136,015 B2
(45) Date of Patent: Nov. 20, 2018

(54) IMAGE PROCESSING APPARATUS, INFORMATION PROCESSING APPARATUS AND IMAGE PROCESSING METHOD

(71) Applicants: Taro Komura, Kanagawa (JP); Norio Sakai, Kanagawa (JP); Yuya Itoh, Kanagawa (JP)

(72) Inventors: Taro Komura, Kanagawa (JP); Norio Sakai, Kanagawa (JP); Yuya Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/687,980

(22) Filed: Aug. 28, 2017

(65) Prior Publication Data

US 2018/0069977 A1 Mar. 8, 2018

(30) Foreign Application Priority Data

Sep. 2, 2016 (JP) ................................ 2016-171881

(51) Int. Cl.
*G06K 15/00* (2006.01)
*H04N 1/00* (2006.01)
(Continued)

(52) U.S. Cl.
CPC ....... *H04N 1/00838* (2013.01); *H04N 1/3876* (2013.01); *H04N 19/129* (2014.11);
(Continued)

(58) Field of Classification Search
CPC ........... H04N 1/00801; H04N 1/00838; H04N 1/2369; H04N 1/3876; H04N 1/6094;
(Continued)

(56) References Cited

U.S. PATENT DOCUMENTS

2007/0070405 A1* 3/2007 Murakata ........... H04N 1/00238
358/1.15
2009/0303549 A1 12/2009 Sakai
(Continued)

FOREIGN PATENT DOCUMENTS

| JP | 2013-093722 | 5/2013 |
| JP | 2014-026422 | 2/2014 |
| JP | 2014-127127 | 7/2014 |

*Primary Examiner* — Gabriel Garcia
(74) *Attorney, Agent, or Firm* — Harness, Dickey & Pierce, P.L.C.

(57) ABSTRACT

According to an embodiment, an image processing apparatus includes a read image processor, a write image processor, an image path selector, and a communication controller. The read image processor is configured to execute an image processing module corresponding to read of image data. The write image processor is configured to execute an image processing module corresponding to write of image data. The image path selector is configured to select a path for transmitting image data output from the image processing modules corresponding to read and write of image data to an external apparatus, and select a path for inputting image data processed by the external apparatus to an image processing module in a subsequent stage. The communication controller is configured to control transmission and reception of image data to and from the external apparatus.

12 Claims, 20 Drawing Sheets

(51) Int. Cl.
*H04N 1/387* (2006.01)
*H04N 19/196* (2014.01)
*H04N 19/176* (2014.01)
*H04N 19/129* (2014.01)
*G06F 3/12* (2006.01)

(52) U.S. Cl.
CPC ......... *H04N 19/176* (2014.11); *H04N 19/197* (2014.11); *H04N 2201/0094* (2013.01)

(58) Field of Classification Search
CPC .. H04N 19/129; H04N 19/176; H04N 19/197; G06F 3/1204
USPC .................................................. 358/1.1, 1.14
See application file for complete search history.

(56) References Cited

U.S. PATENT DOCUMENTS

| | | | |
|---|---|---|---|
| 2012/0110224 A1* | 5/2012 | Tanaka | G06F 5/06 710/57 |
| 2013/0100469 A1 | 4/2013 | Nagai | |
| 2016/0212305 A1 | 7/2016 | Sakai | |
| 2018/0074752 A1* | 3/2018 | Nakazono | G06F 13/38 |

\* cited by examiner bodiment;

IMAGE PROCESSING APPARATUS, INFORMATION PROCESSING APPARATUS AND IMAGE PROCESSING METHOD

CROSS-REFERENCE TO RELATED APPLICATIONS

The present application claims priority under 35 U.S.C. § 119 to Japanese Patent Application No. 2016-171881, filed on Sep. 2, 2016. The contents of which are incorporated herein by reference in their entirety.

BACKGROUND OF THE INVENTION

1. Field of the Invention

The present invention relates to an image processing apparatus, an information processing apparatus, and an image processing method.

2. Description of the Related Art

Conventionally, a technology for causing an external information processing apparatus to execute a function of an electronic device by using cloud computing has been proposed. For example, there is a known technology for causing an information processing apparatus, such as a server device, connected via a network to execute a function of an image processing apparatus, such as a multifunction peripheral (MFP). Japanese Unexamined Patent Application No. 2014-026422 discloses an image output device that can cope with a compression method applied by a host computer, by mounting a processor capable of reconfiguring a specific operation on a printer and by transferring circuit information by adding the circuit information to image data.

However, in the conventional technology, a security measure for data transferred over a network is not adequate. Specifically, in the conventional technology, image data to which the circuit information is added is transferred over the network, and thus the security against exposure of image information over the network is not fully ensured.

SUMMARY OF THE INVENTION

According to one aspect of the present invention, an image processing apparatus includes a read image processor, a write image processor, an image path selector, and a communication controller. The read image processor is configured to execute an image processing module corresponding to read of image data. The write image processor is configured to execute an image processing module corresponding to write of image data. The image path selector is configured to select a path for transmitting image data output from the image processing modules corresponding to read and write of image data to an external apparatus, and select a path for inputting image data processed by the external apparatus to an image processing module in a subsequent stage. The communication controller is configured to control transmission and reception of image data to and from the external apparatus.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
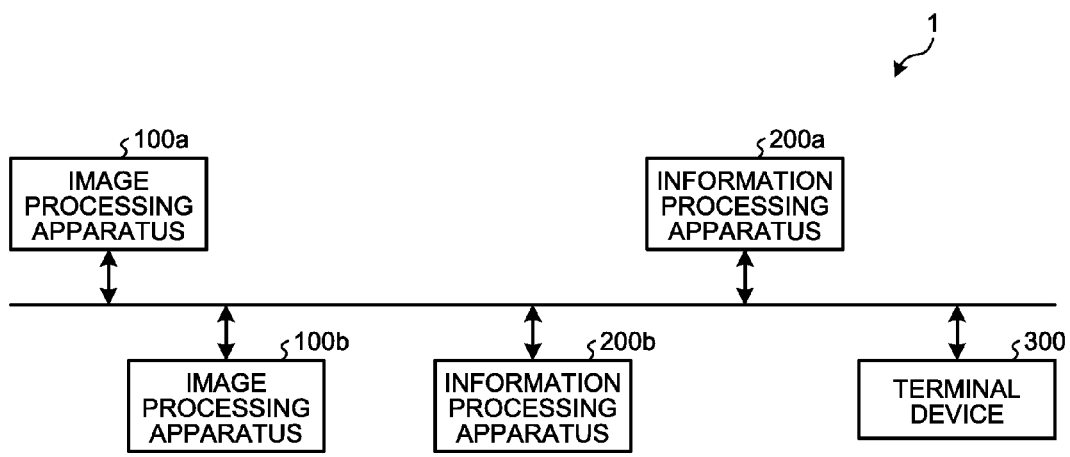
FIG. 1 is a schematic diagram illustrating an example of a system configuration of an image processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings. The present invention is not limited by the embodiments below. The embodiments may be combined appropriately as long as no contradiction is derived.

An object of an embodiment is to ensure the security of data transferred over a network.

First Embodiment

Configuration of Image Processing System

With reference to FIG. 1, a system configuration of an image processing system according to a first embodiment will be described. FIG. 1 is a schematic diagram illustrating an example of the system configuration of the image processing system according to the first embodiment.

As illustrated in FIG. 1, an image processing system 1 includes an image processing apparatus 100a, an image processing apparatus 100b, an information processing apparatus 200a, an information processing apparatus 200b, and a terminal device 300. Hereinafter, the image processing apparatus 100a and the image processing apparatus 100b may simply be referred to as an image processing apparatus 100 when they are not distinguished from each other. Furthermore, the information processing apparatus 200a and the information processing apparatus 200b may simply be referred to as an information processing apparatus 200 when they are not distinguished from each other. In other words, the image processing system 1 includes the one or more image processing apparatuses 100, the one or more information processing apparatuses 200, and the one or more terminal devices 300. The apparatuses and the devices are connected to one another via a network, such as the Internet.

The image processing apparatus 100 receives print data from the terminal device 300, such as a personal computer (PC), performs printing, and distributes scanner data obtained by reading a document to a PC, a facsimile machine (FAX), the information processing apparatus 200, or the like. Conventionally, it has been difficult to upgrade a version of hardware, add a function, or modify a function in an MFP that has already been marketed. In recent years, with an improvement in the line speed of a network, an environment that allows for transmission and reception of not only scanner data and print data but also image data being subjected to image processing in an MFP has been prepared. In the first embodiment, a function to hand over a closed flow of image data in an MFP to an external server device, to cause the external server device to perform new image processing, and to return the processed image data to the MFP is added.

Internal Configuration of Image Processing Apparatus

Figure 2:
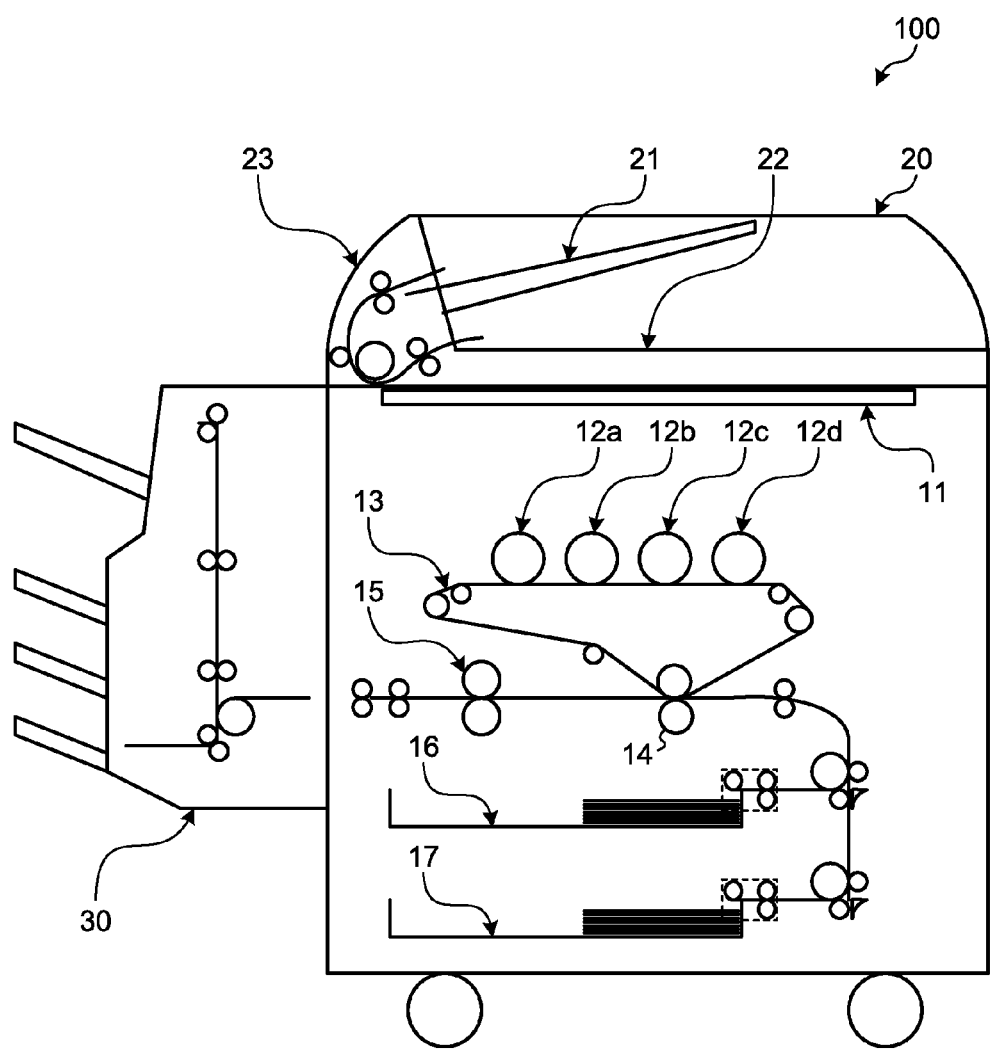
FIG. 2 is a schematic diagram illustrating an example of an internal configuration of an image processing apparatus according to the first embodiment.

Next, with reference to FIG. 2, an internal configuration of the image processing apparatus 100 according to the first embodiment will be described. FIG. 2 is a schematic diagram illustrating an example of the internal configuration of the image processing apparatus 100 according to the first embodiment.

As illustrated in FIG. 2, the image processing apparatus 100 includes a contact glass 11, photoconductor drums 12a to 12d, an intermediate transfer belt 13, a transfer roller 14, a fixing roller 15, a first paper feed tray 16, a second paper feed tray 17, an automatic document feeder 20, a document feed tray 21, a discharge tray 22, a conveying roller 23, and a 3-bin sorter 30. Hereinafter, the photoconductor drums 12a to 12d may simply be referred to as a photoconductor drum 12 when they are not distinguished from one another.

The automatic document feeder (ADF) 20 guides a document placed on the document feed tray 21 to the contact glass 11. The automatic document feeder 20 causes each of documents to be read once. At this time, the conveying roller 23 drives or is driven in order to convey the document. Subsequently, after a charge coupled device (CCD) or a contact image sensor (CIS) reads the document, the automatic document feeder 20 discharges the document onto the discharge tray 22.

In the image processing apparatus 100, a document placed on the contact glass 11 or a document conveyed by the automatic document feeder 20 is once subjected to a read operation performed by the CCD or the CIS, so that an RGB image is generated. Then, the image processing apparatus 100 converts the RGB image to a CMYK image or a monoK image. The RGB image is color image information including colors of red (R), green (G), and blue (B). The CMYK image is color image information including colors of cyan (C), magenta (M), yellow (Y), and black (K). That is, the CMYK image includes image information on four plates of a C image, an M image, a Y image, and a K image. The monoK image is monochrome image information including a color of K (Black). The image processing apparatus 100 prints the CMYK image or the monoK image on a sheet depending on whether the document is a color document or a monochrome document.

The photoconductor drum 12 is irradiated with a laser beam by a laser diode (LD), so that an electrostatic latent image is formed on the surface thereof. A developing unit applies toner to the photoconductor drum 12 on which the electrostatic latent image is formed. The toner remains attached to a portion irradiated with the laser beam and does not remain attached to a portion that is not irradiated with the laser beam. The photoconductor drums 12a to 12d form respective toner images of CMYK colors corresponding to image information, and are arranged at predetermined intervals along the intermediate transfer belt 13. The toner image formed on the photoconductor drum 12 is transferred to the intermediate transfer belt 13. Accordingly, in the case of a color document, toner images of the CMYK colors are sequentially transferred in a superimposed manner, so that a color image is formed. In contrast, in the case of a monochrome document, only the K color is transferred, so that a monochrome image is formed.

The transfer roller 14 transfers the image formed on the intermediate transfer belt 13 to a sheet. The fixing roller 15 fixes the image transferred on the sheet. The sheet is ejected from the image processing apparatus 100. On the first paper feed tray 16 and the second paper feed tray 17, sheets on which images are not yet formed are stacked. The 3-bin sorter 30 includes a stapler and a shift tray. The 3-bin sorter 30 can bind sheets on which images are fixed, for each bundle of a predetermined number of sheets in accordance with an instruction based on a print job.

Configuration of Control System of Image Processing Apparatus

Figure 3:
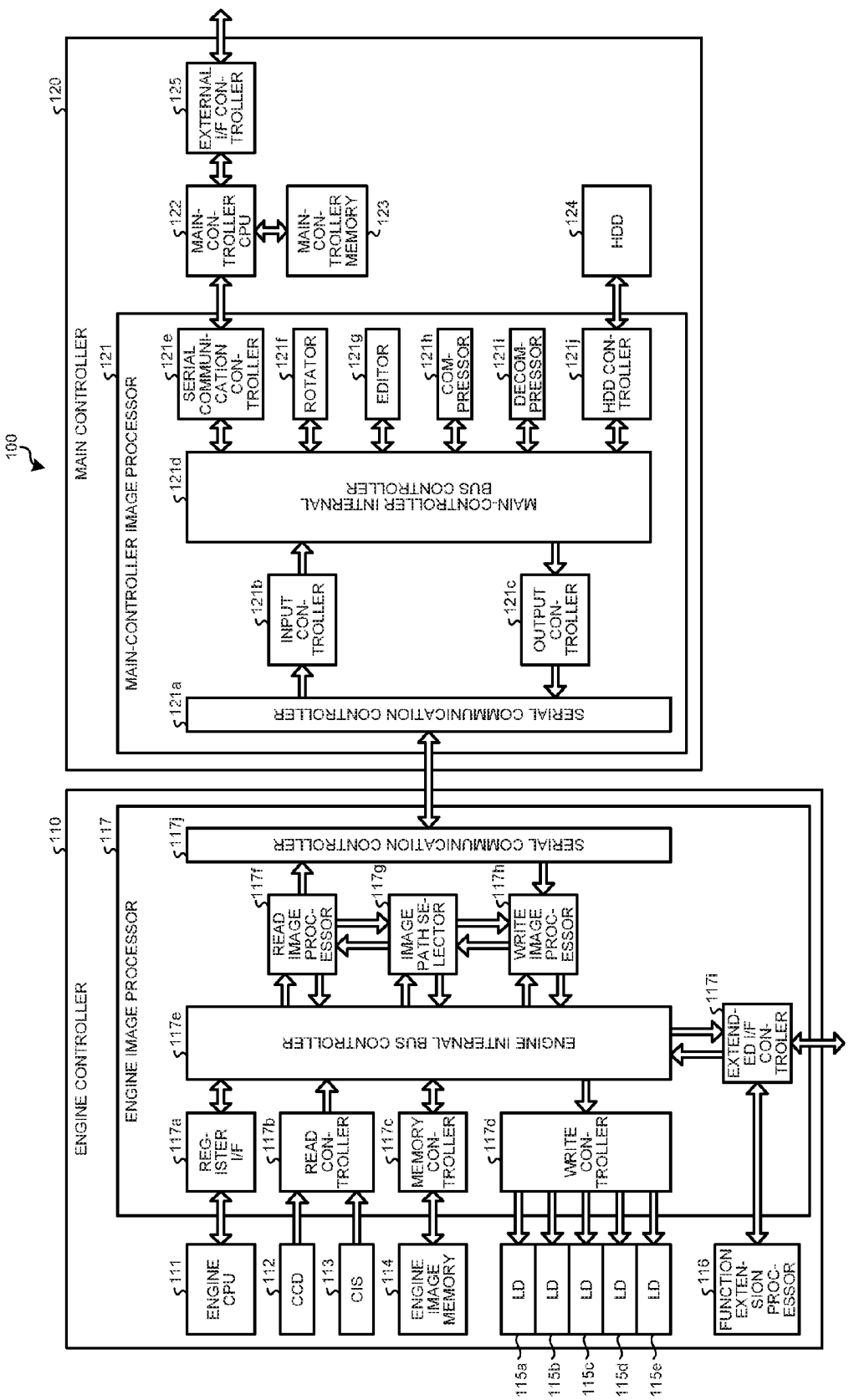
FIG. 3 is a schematic diagram illustrating a configuration example of a control system of the image processing apparatus according to the first embodiment.

Next, with reference to FIG. 3, a configuration of a control system of the image processing apparatus 100 according to the first embodiment will be described. FIG. 3 is a schematic diagram illustrating a configuration example of the control system of the image processing apparatus 100 according to the first embodiment.

As illustrated in FIG. 3, the control system of the image processing apparatus 100 is mainly divided into an engine controller 110 and a main controller 120. The engine controller 110 controls a document read process, controls a sheet write process, and executes various kinds of image processing. The main controller 120 performs a process of receiving print data input from an external interface (I/F), performs a process of distributing a scanner image, and stores image data.

The engine controller 110 includes an engine CPU 111, a CCD 112, a CIS 113, an engine image memory 114, LDs 115a to 115e, a function extension processor 116, and an engine image processor 117. Hereinafter, the LDs 115a to 115e may simply be referred to as an LD 115 when they are not distinguished from one another.

The engine CPU 111 integrally controls the engine controller 110. The CCD 112 reads a document on the contact glass 11 and generates an RGB image. The CIS 113 reads a document conveyed by the automatic document feeder 20 and generates an RGB image. The CCD 112 and the CIS 113 read each of documents once. The image processing apparatus 100 includes the CCD 112 and the CIS 113, and therefore can read both sides of a document simultaneously. In the engine image memory 114, image data read by the CCD 112 and the CIS 113 is stored. The LD 115 irradiates the photoconductor drum 12 with a laser beam modulated based on image data of a printing object, to thereby form an image. The function extension processor 116 is a processor that is used for image processing and that downloads a to-be-used function as circuit information from an external server device, such as the information processing apparatus 200, having an image processing function, and reconfigures a circuit on the basis of the circuit information to implement the function.

The engine image processor 117 includes a register I/F 117a, a read controller 117b, a memory controller 117c, a write controller 117d, an engine internal bus controller 117e, a read image processor 117f, an image path selector 117g, a write image processor 117h, an extended I/F controller 117i, and a serial communication controller 117j. The engine image processor 117 performs various kinds of image processing.

The register I/F 117a stores various control signals received from the engine CPU 111, and transfers the control signals to the engine internal bus controller 117e. Furthermore, the register I/F 117a stores various signals received from the engine internal bus controller 117e, and transfers the signals to the engine CPU 111. The read controller 117b controls read of a document performed by the CCD 112 and the CIS 113, and transfers image data of the read document to the engine internal bus controller 117e. The memory controller 117c controls storage of image data in the engine image memory 114. For example, the memory controller 117c stores image data of a document read by the CCD 112 or the CIS 113 in the engine image memory 114, or acquires image data stored in the engine image memory 114 and transfers the acquired image data to the engine internal bus controller 117e. The write controller 117d controls emission of a laser beam from the LD 115 to the photoconductor drum 12.

The engine internal bus controller 117e arbitrates transfer of image data in the engine image processor 117. The read image processor 117f performs modulation transfer function (MTF) correction, performs smoothing filter correction, generates a CMYK image from an RGB image, generates a monoK image from an RGB image, corrects colors, modifies an image, changes a magnification, or performs encoding (a compression process) with respect to the image data read by the CCD 112 or the CIS 113 under the control of the read controller 117b, for example. The image path selector 117g inputs and outputs image data from and to the extended I/F controller 117i, and selects an image path via the read image processor 117f, the write image processor 117h, or the like. The write image processor 117h outputs, to the LD 115, image information output from the main controller 120, at a timing depending on the intervals between the photoconductor drums 12. In image processing performed by the write image processor 117h, composition of image data of normal colors (CMYK) (a decompression process), a tone process on image data of the normal colors, an image shift process for each plate, a process of controlling a total amount of image data, or the like is performed.

The extended I/F controller 117i outputs image data that is transferred through an image path selected by the image path selector 117g, to the external server device, such as the information processing apparatus 200, having the image processing function. Furthermore, the extended I/F controller 117i transfers image data input from the external server device, such as the information processing apparatus 200, having the image processing function, through an image path selected by the image path selector 117g. The serial communication controller 117j connects the engine controller 110 and the main controller 120. For example, the engine controller 110 and the main controller 120 are connected by using a high-speed serial I/F, such as peripheral connect interconnect (PCI) Express, or the like.

The main controller 120 includes a main-controller image processor 121, a main-controller CPU 122, a main-controller memory 123, a Hard Disk Drive (HDD) 124, and an external I/F controller 125.

The main-controller CPU 122 controls the main controller 120, interprets print data, draws a print image, draws a stamp image, draws a background image, performs a compression process to obtain Joint Photographic Experts Group (JPEG) data, and performs a decompression process from JPEG data to an image. Furthermore, the main-controller CPU 122 stores input image data in the main-controller memory 123. The main-controller memory 123 stores therein various programs and various kinds of data in a rewritable manner. For example, the main-controller memory 123 is a work memory used to temporarily store received print data and used for a print image, a stamp image, a background image, a normal color image, a read image, and the like. The HDD 124 stores therein various programs and various images. The external I/F controller 125 controls connection to an external communication apparatus that is connected via a network. For example, the external I/F controller 125 controls transfer of image to outside and input of print data from outside.

The main-controller image processor 121 includes a serial communication controller 121a, an input controller 121b, an output controller 121c, a controller internal bus controller 121d, a serial communication controller 121e, a rotator 121f, an editor 121g, a compressor 121h, a decompressor 121i, and an HDD controller 121j. The main-controller image processor 121 performs various kinds of image processing.

The serial communication controller 121a connects the main controller 120 and the engine controller 110. The input controller 121b receives input of image data from the engine controller 110, and transfers the image data to the main-controller memory 123. The output controller 121c transfers image data stored in the main-controller memory 123 to the engine controller 110. The controller internal bus controller 121d arbitrates switching of a bus between the blocks or transfer of image data in the main-controller image processor 121. The serial communication controller 121e connects the main-controller image processor 121 and the main-controller CPU 122. The rotator 121f and the editor 121g performs image modification on a printer image or a read image. The compressor 121h compresses data when printer image or a read image is stored. The decompressor 121i performs a process of restoring the compressed stored data to original image data. The HDD controller 121j controls data write and data read to and from the HDD 124.

Figure 4:
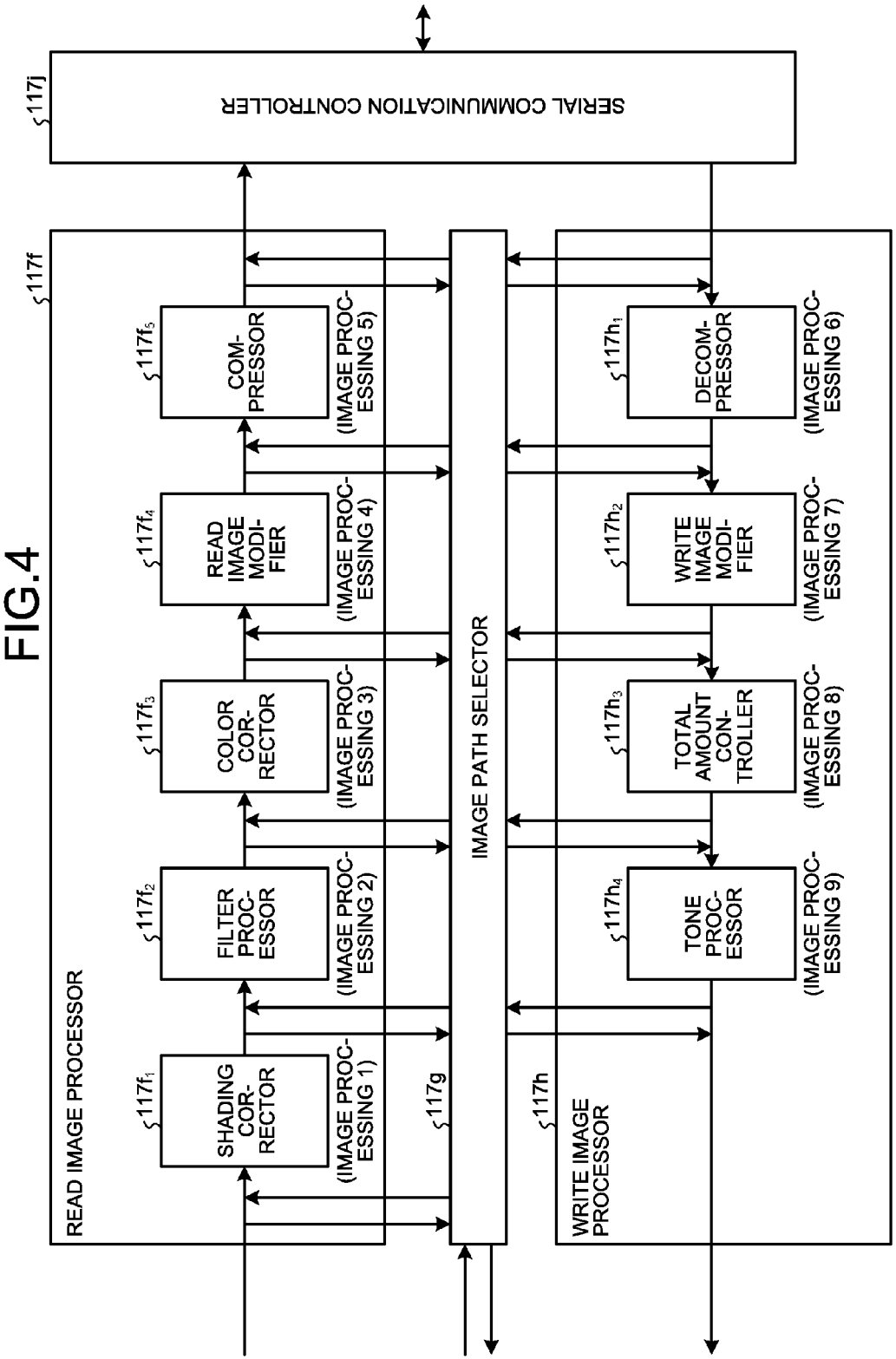
FIG. 4 is a schematic diagram for explaining an example of a selection of a path by an image path selector according to the first embodiment.

FIG. 4 is a schematic diagram for explaining a selection of a path by the image path selector 117g according to the first embodiment. As illustrated in FIG. 4, the read image processor 117f includes a shading corrector $117f_1$, a filter processor $117f_2$, a color corrector $117f_3$, a read image modifier $117f_4$, and a compressor $117f_5$.

The shading corrector $117f_1$ corrects density unevenness in an RGB image generated by the CCD 112 or the CIS 113. The processing performed by the shading corrector $117f_1$ is referred to as "image processing 1". The filter processor $117f_2$ performs smoothing processing or edge enhancement processing to improve the quality of an image. The processing performed by the filter processor $117f_2$ is referred to as "image processing 2". The color corrector $117f_3$ generates, from an RGB image, a full-color CMYK image to be output. The processing performed by the color corrector $117f_3$ is referred to as "image processing 3". The read image modifier $117f_4$ sets resolution to a specified one, changes a magnification such as enlargement or reduction, or adjusts an image position, for example. The processing performed by the read image modifier $117f_4$ is referred to as "image processing 4". The compressor $117f_5$ performs a process of compressing an image. The compressor $117f_5$ sends a raw image of CMYK; therefore, to reduce a transfer load of the serial communication controller 117j in a subsequent stage, the compressor $117f_5$ compresses an image. The processing performed by the compressor $117f_5$ is referred to as "image processing 5".

Furthermore, as illustrated in FIG. 4, the write image processor 117h includes a decompressor $117h_1$, a write image modifier $117h_2$, a total amount controller $117h_3$, and a tone processor $117h_4$.

The decompressor $117h_1$ decompresses compressed data stored in the main-controller memory 123 or the HDD 124 to a CMYK image (a raw image of CMYK). The processing performed by the decompressor $117h_1$ is referred to as "image processing 6". The write image modifier $117h_2$ adjusts a print position or performs trimming, for example. The processing performed by the write image modifier $117h_2$ is referred to as "image processing 7". The total amount controller $117h_3$ reduces the density of each of colors such that an additional value of input CMYK image data falls below an upper limit. The processing by the total amount controller $117h_3$ is performed in order to prevent a fixing failure due to overlapping of toner. The processing performed by the total amount controller $117h_3$ is referred to as "image processing 8". The tone processor $117h_4$ converts a tone value of input image data to a tone value appropriate for printing. The processing performed by the tone processor $117h_4$ is referred to as "image processing 9".

The image path selector 117g selects an image path between image processing modules. Therefore, in accordance with the image path selected by the image path selector 117g, image data is transferred to the engine image memory 114, the extended I/F controller 117i, or the function extension processor 116 via the engine internal bus controller 117e. Furthermore, in accordance with the image path selected by the image path selector 117g, image data is transferred from the extended I/F controller 117i, the engine image memory 114, or the function extension processor 116 to each of the image processing modules (the image processing 1 to the image processing 9). In this manner, the image path selector 117g controls switching of input of image data. For example, when the external server device, such as the information processing apparatus 200, is caused to perform the image processing 2, output of the image processing 1 is transferred to the extended I/F controller 117i and input of the image processing 3 is switched to input from the extended I/F controller 117i.

Input and Output of Image Data

Figure 5:
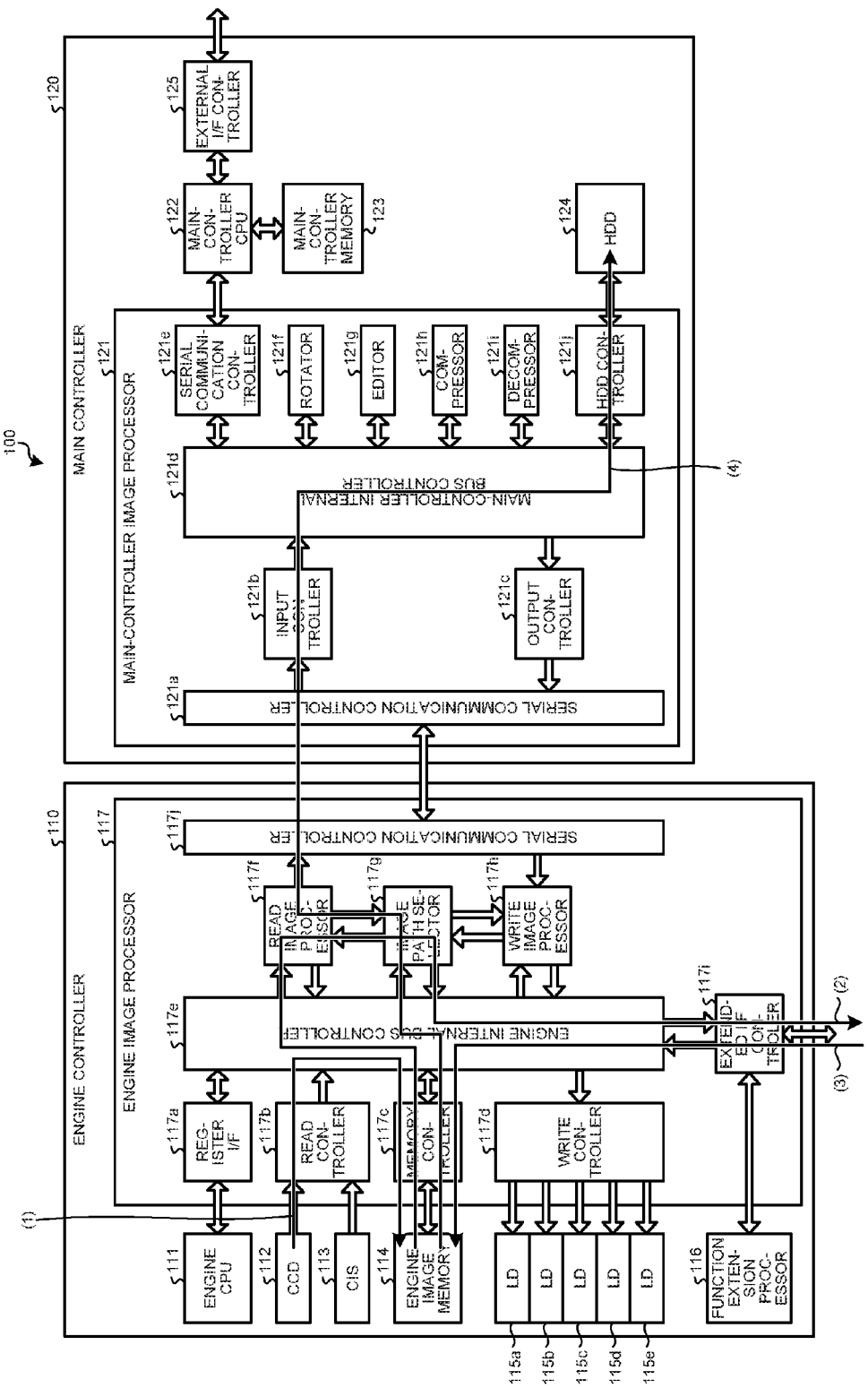
FIG. 5 is a schematic diagram for explaining an example of input and output of image data according to the first embodiment.

Next, with reference to FIG. 5, input and output of image data according to the first embodiment will be described. FIG. 5 is a schematic diagram for explaining an example of input and output of image data according to the first embodiment. In FIG. 5, an example is illustrated in which the "image processing 2" that is a part of a function of read image processing is implemented by "new image processing 2" prepared by the external server device.

For example, image data generated through read by the CCD 112 or the CIS 113 is stored in the engine image memory 114 via the read controller 117b, the engine internal bus controller 117e, and the memory controller 117c (see (1) in FIG. 5). The image data stored in the engine image memory 114 is read in synchronization with an image transfer speed of the extended I/F controller 117i. For example, the image data read from the engine image memory 114 is transferred to the extended I/F controller 117i via the memory controller 117c, the engine internal bus controller 117e, the read image processor 117f, the image path selector 117g, and the engine internal bus controller 117e (see (2) in FIG. 5). In this case, the read image processor 117f executes the image processing module "image processing 1" and outputs image data subjected to the image processing. The extended I/F controller 117i transfers the image data to the external server device, such as the information processing apparatus 200, via a network.

The external server device, such as the information processing apparatus 200, executes the image processing module "new image processing 2" and transmits image data subjected to the image processing to the image processing apparatus 100. The extended I/F controller 117i receives input of image data from the external server device, such as the information processing apparatus 200. For example, the image data input to the extended I/F controller 117i is stored in the engine image memory 114 via the engine internal bus controller 117e and the memory controller 117c (see (3) in FIG. 5). With respect to the image data stored in the engine image memory 114, input is switched to the image processing module "image processing 3" of the read image processor 117f by the image path selector 117g. For example, the image data read from the engine image memory 114 is stored in the HDD 124 via the memory controller 117c, the engine internal bus controller 117e, the image path selector 117g, the read image processor 117f, the serial communication controller 117j, the serial communication controller 121a, the input controller 121b, the controller internal bus controller 121d, and the HDD controller 121j (see (4) in FIG. 5). In this case, input is switched to the image processing module "image processing 3" of the read image processor 117f by the image path selector 117g, and the read image processor 117f executes the image processing module "image processing 3". Thereafter, subsequent processes are performed by using the image data stored in the HDD 124.

Figure 6:
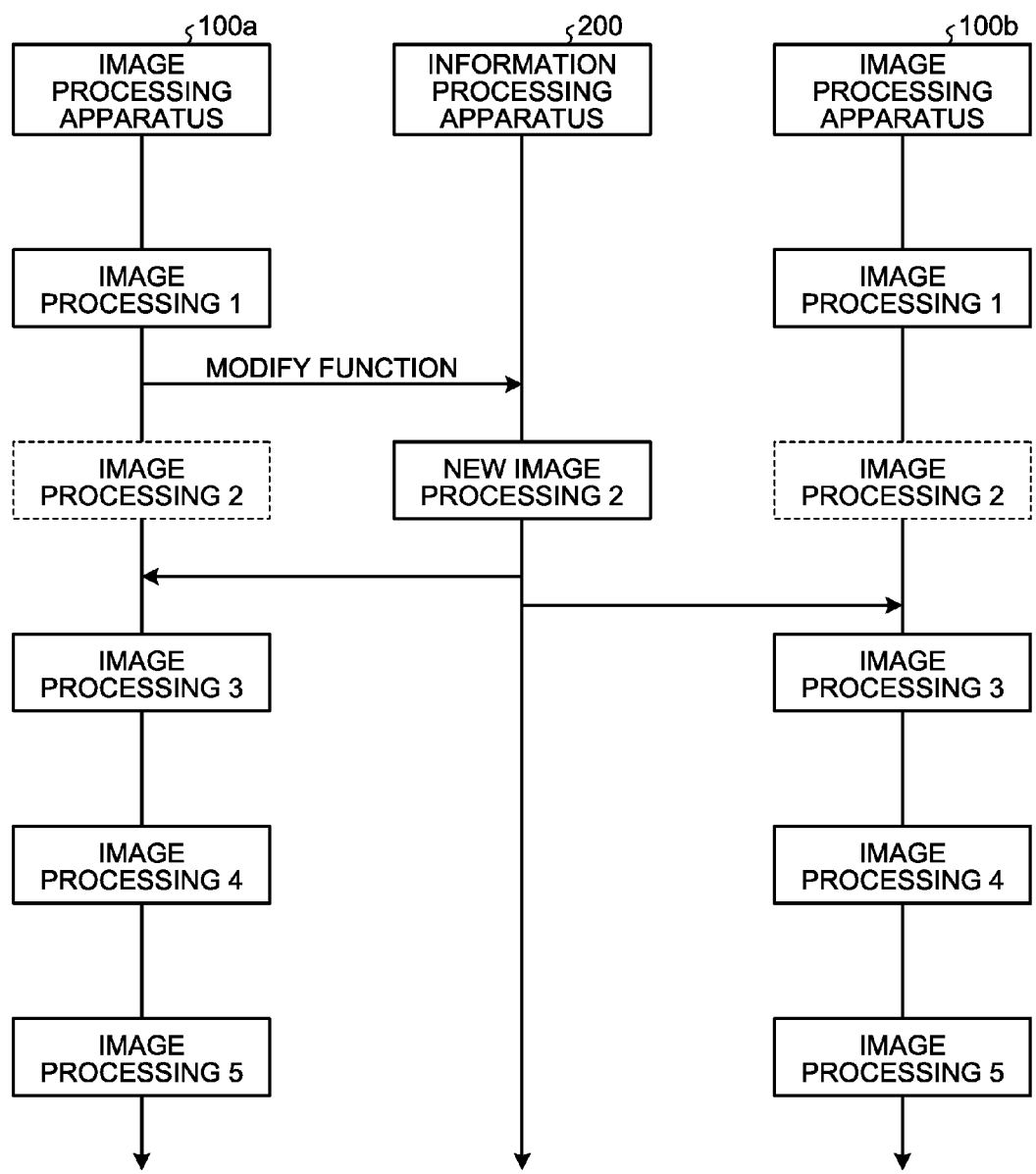
FIG. 6 is a sequence diagram illustrating an example of input and output of image data according to the first embodiment.

FIG. 6 is a sequence diagram illustrating an example of input and output of image data according to the first embodiment. In FIG. 6, an example is illustrated in which the "image processing 2" is implemented by the "new image processing 2" prepared by the external server device.

As illustrated in FIG. 6, the image processing apparatus 100a executes the image processing module "image processing 1" and transmits the processed image data to the information processing apparatus 200. Accordingly, the information processing apparatus 200 executes the image processing module "new image processing 2", and transmits the processed image data to the image processing apparatus 100a. Subsequently, the image processing apparatus 100a executes the image processing module "image processing 3", the "image processing 4", and the "image processing 5" on the image data received from the information processing apparatus 200.

In the first embodiment, it may be possible to connect a plurality of MFPs (the image processing apparatus 100a and the image processing apparatus 100b) to a single external server device (the information processing apparatus 200). In this case, as illustrated in FIG. 6, after the information processing apparatus 200 has executed the image processing module "new image processing 2", it may be possible to transmit the processed image data to the image processing apparatus 100b. Accordingly, the image processing apparatus 100b executes the image processing module "image processing 3", the "image processing 4", and the "image processing 5" on the image data received from the information processing apparatus 200.

Figure 7:
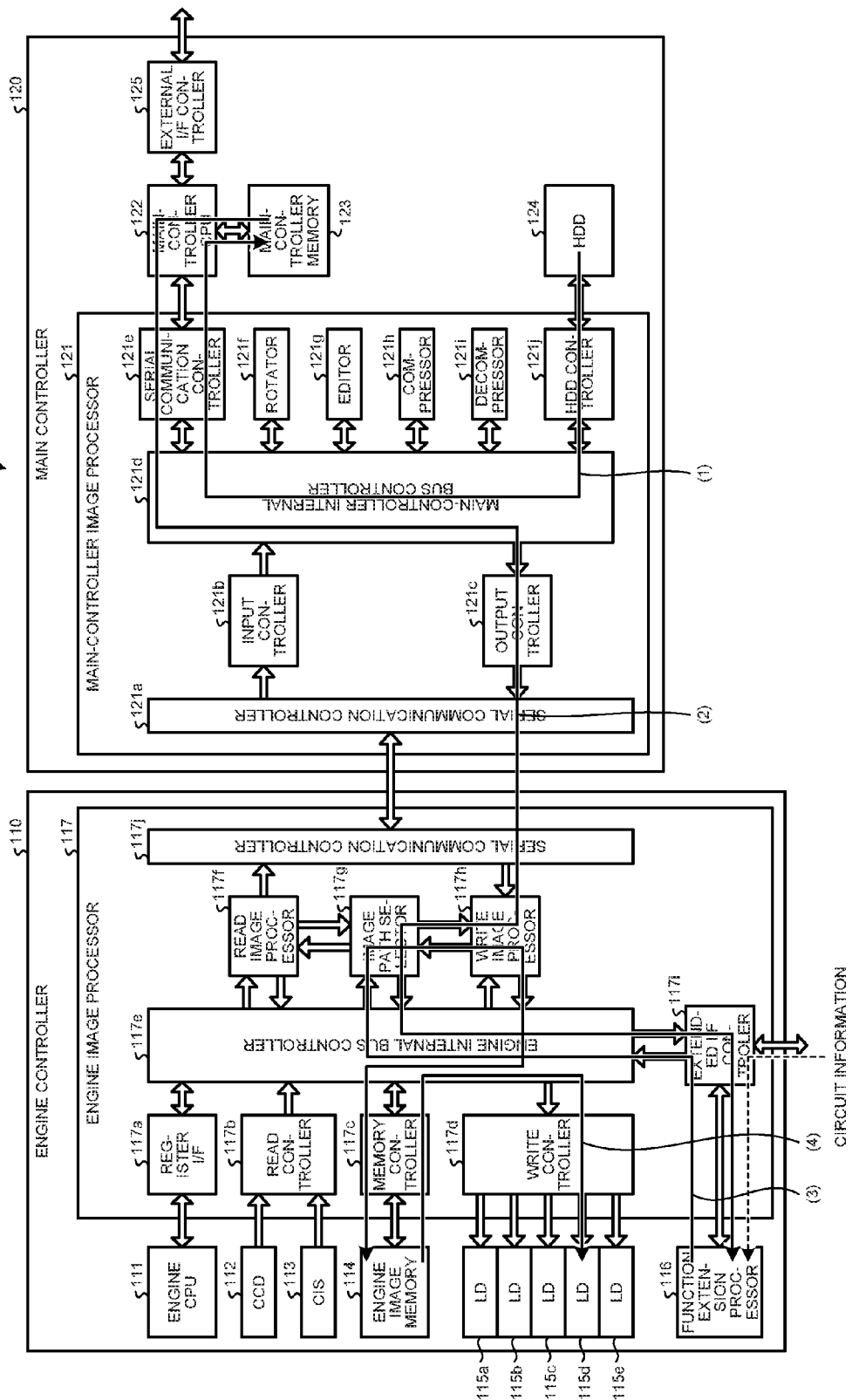
FIG. 7 is a schematic diagram for explaining an example of input and output of image data according to the first embodiment.

FIG. 7 is a schematic diagram for explaining an example of input and output of image data according to the first embodiment. In FIG. 7, an example is illustrated in which a part of a function of write image processing is reconfigured on the function extension processor 116 to implement new image processing and perform a printing operation.

First, the image processing apparatus 100 downloads circuit information for implementing an image processing function to be modified or added, from the external server device, such as the information processing apparatus 200. Then, the image processing apparatus 100 reconfigures the function extension processor 116 by using the acquired circuit information, to thereby implement a circuit (a dashed line in FIG. 7). Subsequently, image data stored in the HDD 124 is loaded on the main-controller memory 123. For example, the image data stored in the HDD 124 is stored in the main-controller memory 123 via the HDD controller 121j, the controller internal bus controller 121d, the serial communication controller 121e, and the main-controller CPU 122 (see (1) in FIG. 7).

The image path selector 117g causes the image data stored in the main-controller memory 123 to be input to the function extension processor 116. For example, the image data read from the main-controller memory 123 is transferred to the function extension processor 116 via the main-controller CPU 122, the serial communication controller 121e, the controller internal bus controller 121d, the output controller 121c, the serial communication controller 121a, the serial communication controller 117j, the write image processor 117h, the image path selector 117g, the engine internal bus controller 117e, and the extended I/F controller 117i (see (2) in FIG. 7). In this case, the write image processor 117h executes the image processing module, and output of the processed image data is switched to the function extension processor 116 by the image path selector 117g.

The image data processed by the function extension processor 116 is returned to the write image processor 117h, and thereafter stored in the engine image memory 114. For example, the image data processed by the function extension processor 116 is stored in the engine image memory 114 via the extended I/F controller 117i, the engine internal bus controller 117e, the image path selector 117g, the write image processor 117h, the engine internal bus controller 117e, and the memory controller 117c (see (3) in FIG. 7). In this case, input is switched to the image processing module of the write image processor 117h by the image path selector 117g, and the write image processor 117h executes the image processing module.

The image data stored in the engine image memory 114 is printed on a sheet. For example, the image data stored in the engine image memory 114 is transferred to the LD 115 via the memory controller 117c, the engine internal bus controller 117e, and the write controller 117d (see (4) in FIG. 7). Accordingly, the image data is read in synchronization with conveyance of a transfer sheet, an image of the image data is printed by the LD 115, and the image is printed on the transfer sheet.

When the external server device, such as the information processing apparatus 200, is caused to perform image processing, the processing depends on the state of a network. Specifically, when the quality of the network is not good, it may take a long time to transfer image data or a line may be disconnected. Therefore, as described above, a processor is provided that downloads the circuit information to implement the same function as the function of the image processing performed by the external server device and that can reconfigure the function from the circuit information. The function to be modified or added is loaded in the engine controller 110; therefore, it is possible to flexibly modify or add a function without taking into account a transfer speed or a line disconnection.

Figure 8:
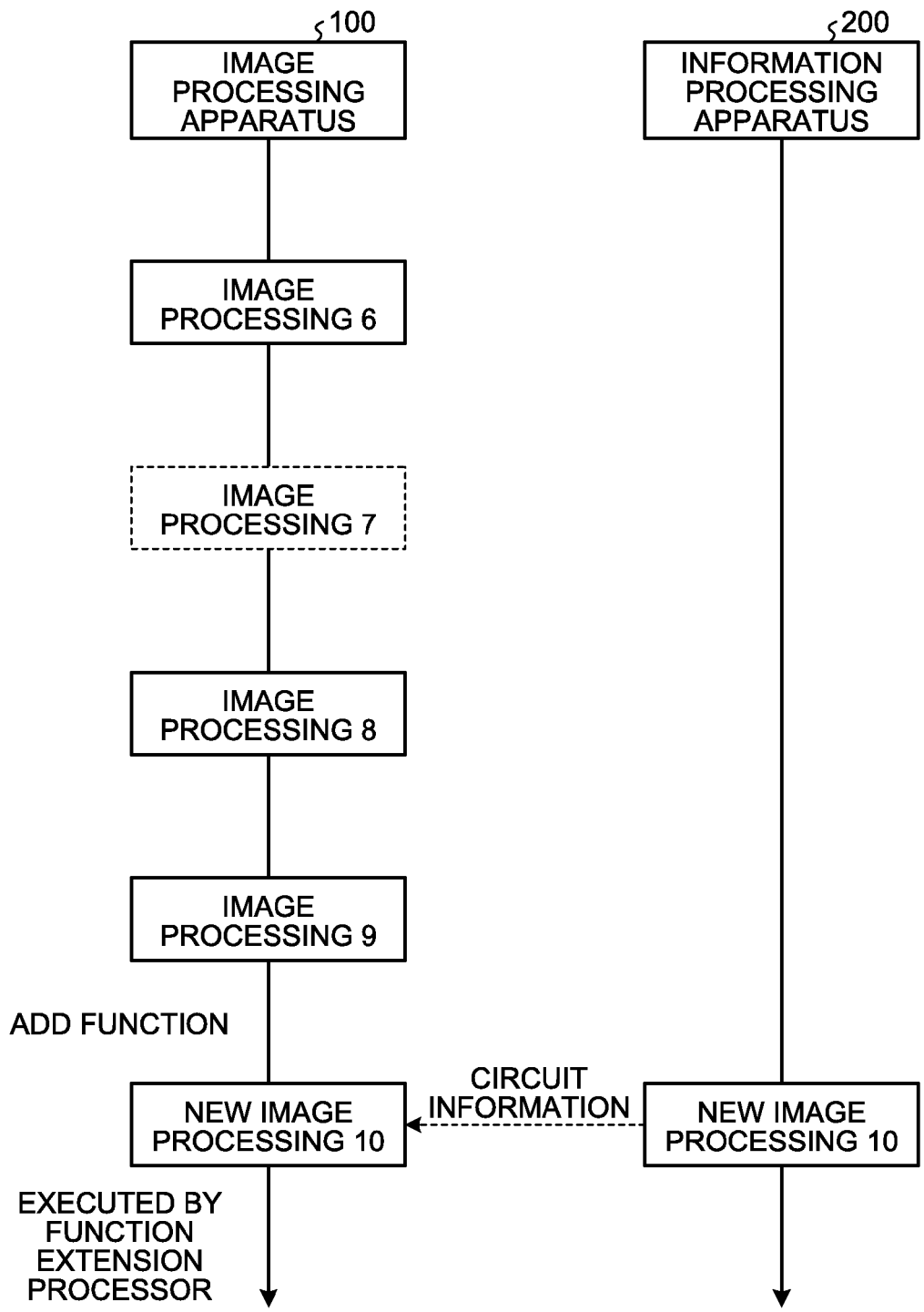
FIG. 8 is a sequence diagram illustrating an example of input and output of image data according to the first embodiment.

FIG. 8 is a sequence diagram illustrating an example of input and output of image data according to the first embodiment. In FIG. 8, an example is illustrated in which "new image processing 10" that is a function added to the image processing apparatus 100 is performed after the "image processing 9".

As illustrated in FIG. 8, the image processing apparatus 100 acquires the circuit information from the information processing apparatus 200 after executing the image processing modules "image processing 6", "image processing 7", "image processing 8", and "image processing 9", and reconfigures the function extension processor 116 to implement a circuit. Accordingly, the image processing apparatus 100 executes the new image processing module "new image processing 10". For another example, the image processing apparatus 100 may perform the "new image processing 10" in which a function of the "image processing 7" is modified, without performing the "image processing 7".

Figure 9:
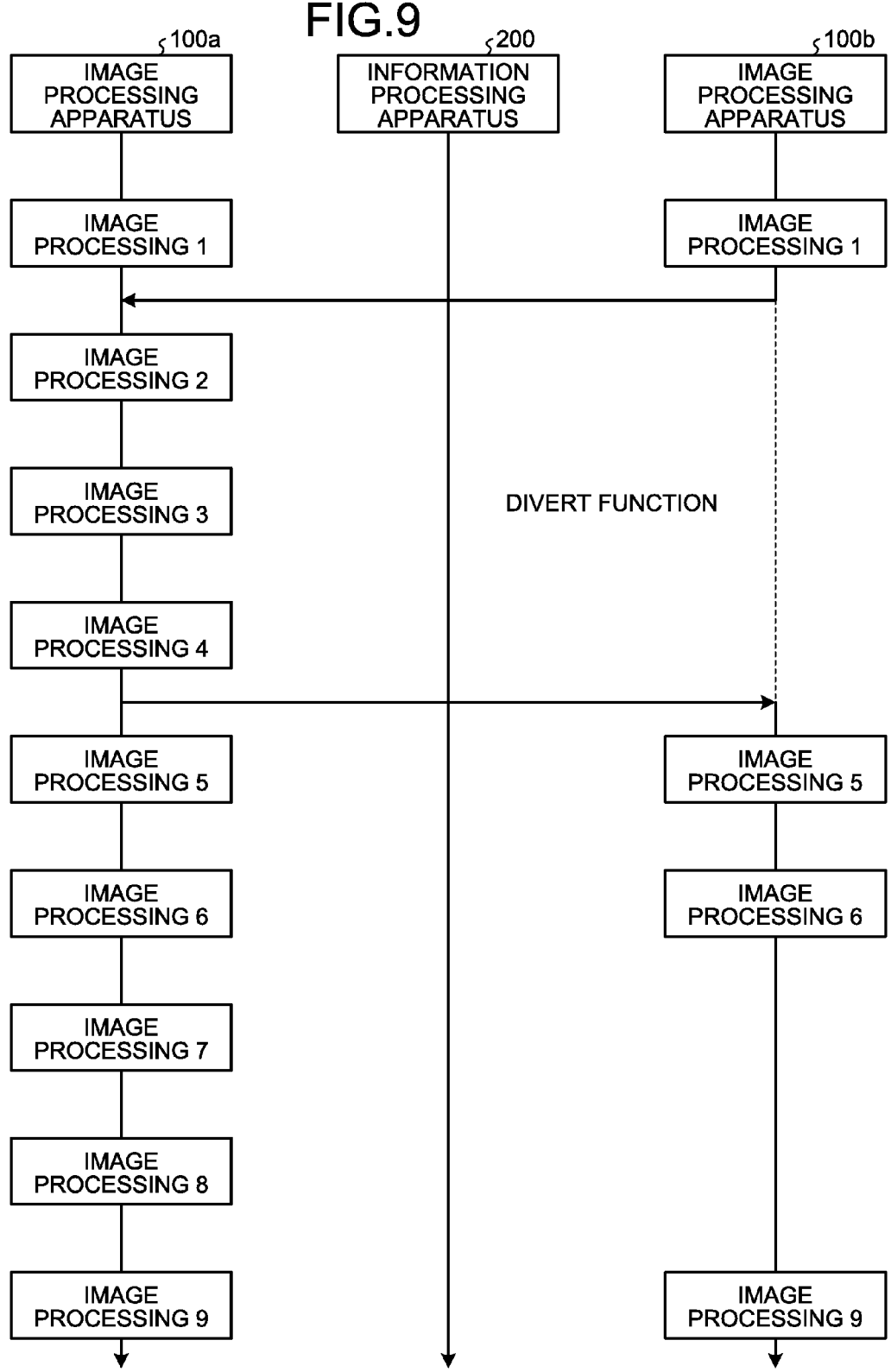
FIG. 9 is a sequence diagram illustrating an example of diverting a part of a function of an image processing module according to the first embodiment.

Meanwhile, in the first embodiment, it may be possible to cause a different image processing apparatus included in the image processing system 1 to execute a part of the image processing module. FIG. 9 is a sequence diagram illustrating an example of diverting a part of a function of the image processing module according to the first embodiment. In FIG. 9, an example is illustrated in which the image processing apparatus 100a, the image processing apparatus 100b, and the information processing apparatus 200 are included in the image processing system 1.

As illustrated in FIG. 9, the image processing apparatus 100b executes the image processing module "image processing 1" and transmits the processed image data to the image processing apparatus 100a via the information processing apparatus 200. The image processing apparatus 100a executes the image processing modules "image processing 2", "image processing 3", and "image processing 4"

on the image data received from the image processing apparatus 100b, and transmits the processed image data to the image processing apparatus 100b via the information processing apparatus 200. Subsequently, the image processing apparatus 100b executes the image processing modules "image processing 5", "image processing 6", and "image processing 9" on the image data received from the image processing apparatus 100a.

The image processing apparatus 100 according to the first embodiment includes an interface to transmit and receive image data to and from the external server device, such as the information processing apparatus 200. For example, if the image processing apparatus 100a having a more sophisticated function than the image processing apparatus 100b performs only a printing operation (only the write image processor 117h is operating), the function of the read image processor 117f of the image processing apparatus 100a is released to outside. Accordingly, the image processing apparatus 100b having a less sophisticated function than the image processing apparatus 100a can share the function of the read image processor 117f of the sophisticated image processing apparatus 100a via the information processing apparatus 200. Consequently, by including the sophisticated image processing apparatus 100 in the image processing system 1, it becomes possible to improve the functions of a plurality of the image processing apparatuses 100.

The image processing apparatus 100 selects a path for transmitting, to the external apparatus, image data output from an image processing module that copes with read or write of image data, and a path for inputting image data processed by the external apparatus to an image processing module in a subsequent stage; therefore, it is possible to perform a part of the image processing by the external apparatus and return the processed image data to the image processing apparatus 100. Furthermore, the image processing apparatus 100 reconfigures a circuit in the function extension processor on the basis of the circuit information in order to implement the image processing function; therefore, it is possible to flexibly improve or modify a part of a function or add a new function with respect to the existing image processing function. Moreover, the image processing apparatus 100 can extend a function; therefore, it is possible to control leakage of image data to a network and improve the security of the image data.

Second Embodiment

Next, a second embodiment will be described. The same components as those of the above-described first embodiment are denoted by the same symbols, and the same explanation may be omitted. In the above-described first embodiment, an example has been described in which the external server device, such as the information processing apparatus 200, is caused to execute a part of a function of a series of image processing, and an additional function or a modified function is configured on a processor based on the circuit information to execute a part of a function. In the second embodiment, a security measure for image data handled in transmission and reception with respect to the external server device, such as the information processing apparatus 200, will be described.

Functional Configuration of Image Processing Apparatus

Figure 10:
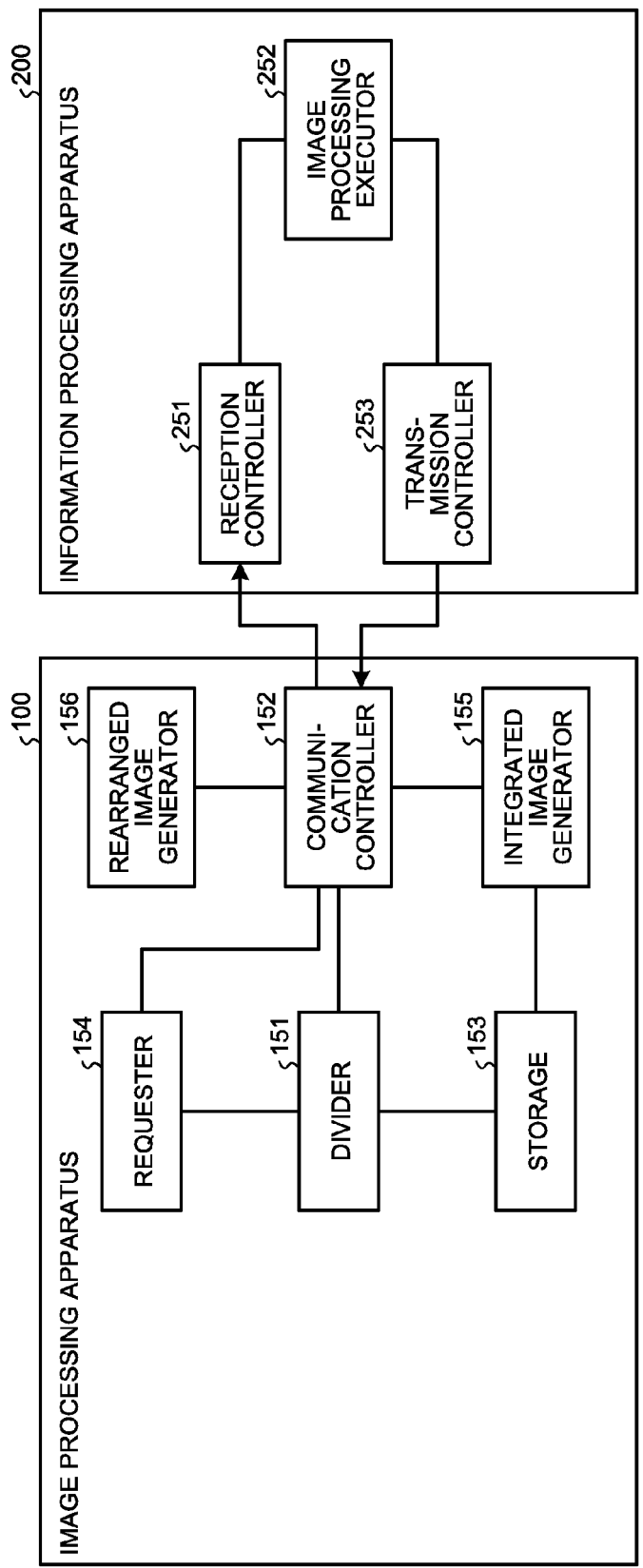
FIG. 10 is a block diagram illustrating a functional configuration example of an image processing apparatus according to a second embodiment.

With reference to FIG. 10, a functional configuration of the image processing apparatus 100 according to the second embodiment will be described. FIG. 10 is a block diagram illustrating a functional configuration example of the image processing apparatus 100 according to the second embodiment. In FIG. 10, a functional configuration of the information processing apparatus 200 is also illustrated.

As illustrated in FIG. 10, the image processing apparatus 100 includes a divider 151, a communication controller 152, a storage 153, a requester 154, an integrated image generator 155, and a rearranged image generator 156. A part or all of the above-described units other than the storage 153 may be implemented by software (a program) or may be implemented by a hardware circuit. Furthermore, the above-described units other than the storage 153 correspond to functions implemented by the engine CPU 111 or the main-controller CPU 122.

Figure 11:
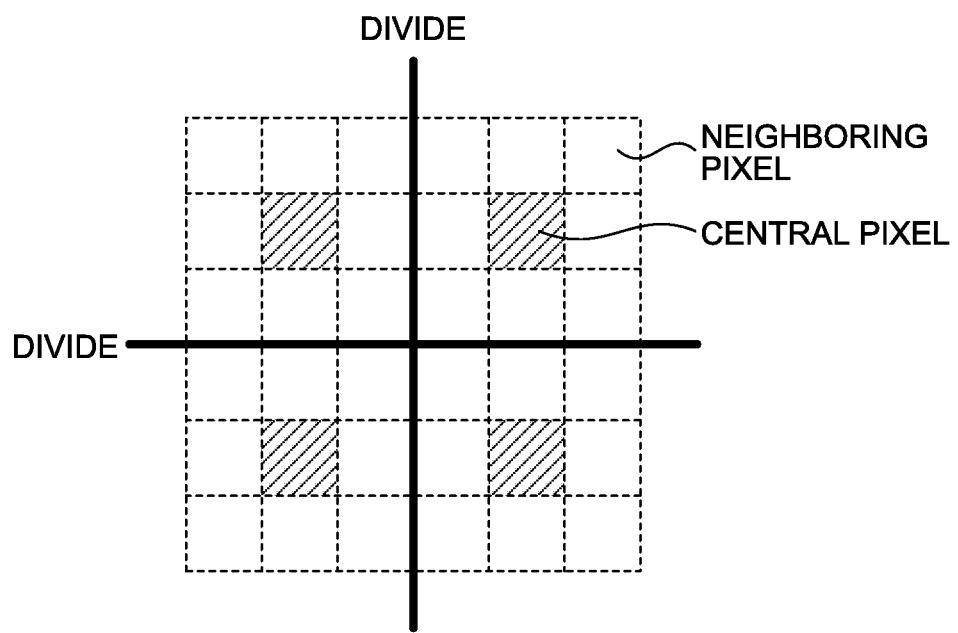
FIG. 11 is a schematic diagram for explaining an example of dividing image data according to the second embodiment.

The divider 151 divides image data to be transmitted to the external apparatus into image blocks with a size corresponding to the number of neighboring pixels to be referred to in the image processing. More specifically, the divider 151 divides image data to be transmitted to the external server device, such as the information processing apparatus 200, into image blocks with a size corresponding to the number of neighboring pixels to be referred to in the image processing performed by the information processing apparatus 200. For example, the image block includes 3×3 pixels, 5×5 pixels, or the like (hereinafter, the image block may be referred to as a 3×3 image block, a 5×5 image block, or the like). FIG. 11 is a schematic diagram for explaining an example of dividing image data according to the second embodiment. As illustrated in FIG. 11, if the information processing apparatus 200 performs image processing in which a single neighboring pixel is referred to with respect to image data of 6×6 pixels, the divider 151 divides the image data into 3×3 image blocks. When image processing is performed on the 3×3 image blocks, only central pixels in FIG. 11 can refer to the neighboring pixels. Furthermore, if the information processing apparatus 200 performs image processing in which two neighboring pixels are referred to, the divider 151 divides image data into 5×5 image blocks. The image blocks are not limited to the 3×3 image blocks and the 5×5 image blocks, and image blocks including a certain number of pixels may be applied. In other words, the divider 151 may divide the image data to be transmitted to the information processing apparatus 200 into image blocks including an arbitrary number of pixels.

By dividing the image data into the image blocks, even when image information is leaked on the network between the image processing apparatus 100 and the information processing apparatus 200, information on the original image data can hardly be obtained from a part of the image data (an image block); therefore, it is possible to improve the security.

The communication controller 152 controls transmission and reception of image data to and from the external apparatus. More specifically, the communication controller 152 sequentially transmits the image blocks divided by the divider 151 to the external server device, such as the information processing apparatus 200, in an overlapping manner. As described above, for example, when image processing is performed on the 3×3 image blocks, only the central pixels can refer to the neighboring pixels (see FIG. 11). Therefore, to perform the image processing on all of the pixels, a single image block is transmitted to the information processing apparatus 200 in an overlapping manner. For example, when a 3×3 image block is to be transmitted, two 3×3 image blocks are transmitted in an overlapping manner so that image processing for the 3×3 image block can be performed on all of the pixels. For another example, when a 5×5 image block is to be transmitted, three 5×5 image blocks are transmitted in an overlapping manner so that image processing for the 5×5 image block can be performed on all of the pixels.

In general, image processing is performed in order to enhance edges or smooth tones. Furthermore, image processing is performed with reference to neighboring pixels of a target pixel to be subjected to the image processing, in accordance with the conditions of the target pixel and the neighboring pixels. Therefore, when image data is transferred between the image processing apparatus 100 and the information processing apparatus 200 such that the image data is divided for the sake of security, a block including neighboring pixels used for image processing to be applied is needed for all of the pixels. Furthermore, to improve the processing speed, it is preferable for a data receiving side to sequentially perform image processing in units of an image block that is transferred in a divided manner, instead of starting the image processing after receiving all of the image blocks transferred in a divided manner. To cope with this, by transmitting a transfer target image block in an overlapping manner in accordance with image processing to be applied, it becomes possible to perform the image processing on all of the pixels. Specifically, the information processing apparatus 200 that has received overlapping image blocks from the image processing apparatus 100 sequentially performs image processing on the overlapping image blocks in the order in which the image blocks are received, and returns the image data subjected to the image processing to the image processing apparatus 100. The image data received from the information processing apparatus 200 is input to the image processing module in a subsequent stage as described in the first embodiment.

Furthermore, in the second embodiment, it may be possible to return only a part of image data subjected to the image processing when returning the image data processed by the information processing apparatus 200. This function will be described below.

The storage 153 holds image data transmitted to the external apparatus. More specifically, the storage 153 stores image data transmitted to the external server device, such as the information processing apparatus 200, without deleting the image data, under the control of the communication controller 152.

The requester 154 requests the external apparatus to return only a partial image representing a part of an image subjected to the image processing in the image data. More specifically, when image data is to be transmitted to the external server device, such as the information processing apparatus 200, under the control of the communication controller 152, the requester 154 requests the information processing apparatus 200 to return only a partial image of image data to which the image processing is applied by the information processing apparatus 200 in the image data to be transmitted. The requester 154 requests, as a trigger, a notice indicating that the divider 151 has generated image blocks by dividing the image data. Accordingly, the information processing apparatus 200 performs the image processing on the image data transmitted by the image processing apparatus 100, and returns only the partial image subjected to the image processing to the image processing apparatus 100.

The integrated image generator 155 generates an image in which the held image data and the partial image returned from the external apparatus are integrated. More specifically, the integrated image generator 155 integrates the image data held by the storage 153 and the partial image received from the information processing apparatus 200 under the control of the communication controller 152, to thereby generate image data in which the image processing performed by the information processing apparatus 200 is reflected.

Figure 12:
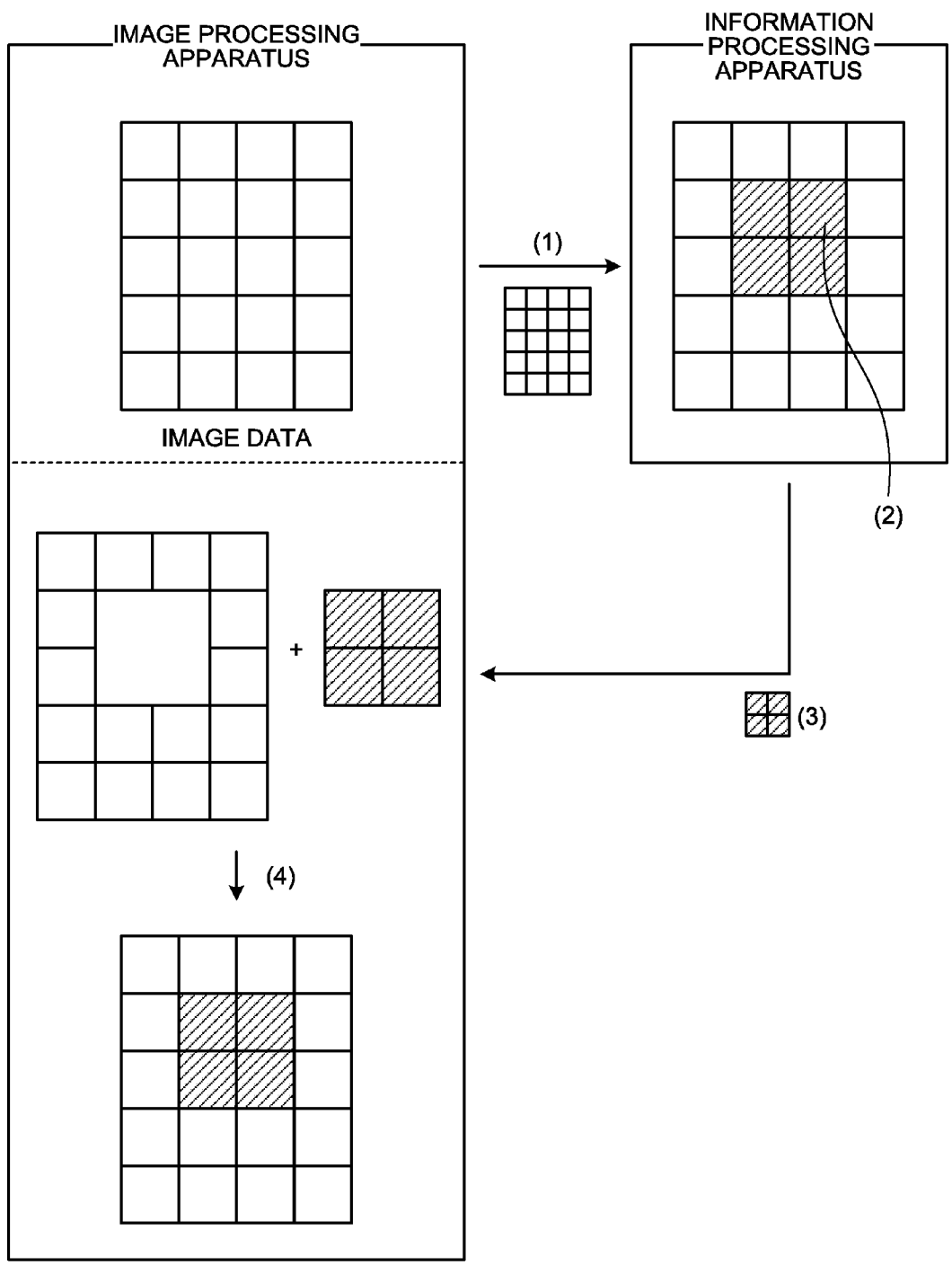
FIG. 12 is a schematic diagram for explaining an example of transferring image data according to the second embodiment.

FIG. 12 is a schematic diagram for explaining an example of transferring image data according to the second embodiment. The image processing apparatus 100 transmits image data to the information processing apparatus 200 (see (1) in FIG. 12). At this time, the image processing apparatus 100 holds the transmitted image data without deleting the image data, and sends a request to return only a partial image to which the image processing is applied in the image data. The information processing apparatus 200 performs the image processing on the image data received from the image processing apparatus 100 (see (2) in FIG. 12). In FIG. 12, the partial image to which the image processing is applied is indicated by diagonal pattern.

Then, the information processing apparatus 200 returns only the partial image subjected to the image processing in the image data to the image processing apparatus 100 (see (3) in FIG. 12). The image processing apparatus 100 generates an image by integrating the held image data and the partial image received from the information processing apparatus 200 (see (4) in FIG. 12). With this operation, it is possible to reduce the traffic of the image data from the information processing apparatus 200 to the image processing apparatus 100.

Furthermore, in the second embodiment, it may be possible to transmit the image blocks in an arbitrary order when the image blocks are transmitted from the image processing apparatus 100 to the information processing apparatus 200. This function will be described below.

The communication controller 152 transmits the image blocks to the external apparatus in an arbitrary order, and receives the image blocks that are processed in the arbitrary order (in order of reception by the external apparatus) from the external apparatus. More specifically, the communication controller 152 transmits the image blocks, which are generated by the divider 151 by dividing the image data, to the information processing apparatus 200 in a random order. At this time, the communication controller 152 holds the order in which the image blocks are transmitted (the positions of the image blocks in the image data) so that the image blocks can be placed back to the original positions. The information processing apparatus 200 sequentially performs image processing on the image blocks received from the image processing apparatus 100, and returns the image blocks subjected to the image processing to the image processing apparatus 100. With this operation, the communication controller 152 receives the image blocks from the information processing apparatus 200 in the order in which the image blocks are processed.

The rearranged image generator 156 generates an image in which the received image blocks are rearranged in the same positions as in the image data before the division. More specifically, the rearranged image generator 156 generates an image in which the image blocks received by the communication controller 152 are rearranged in the same positions as in the image data before the division (before the transmission) on the basis of the order in which the image blocks are transmitted.

Figure 13:
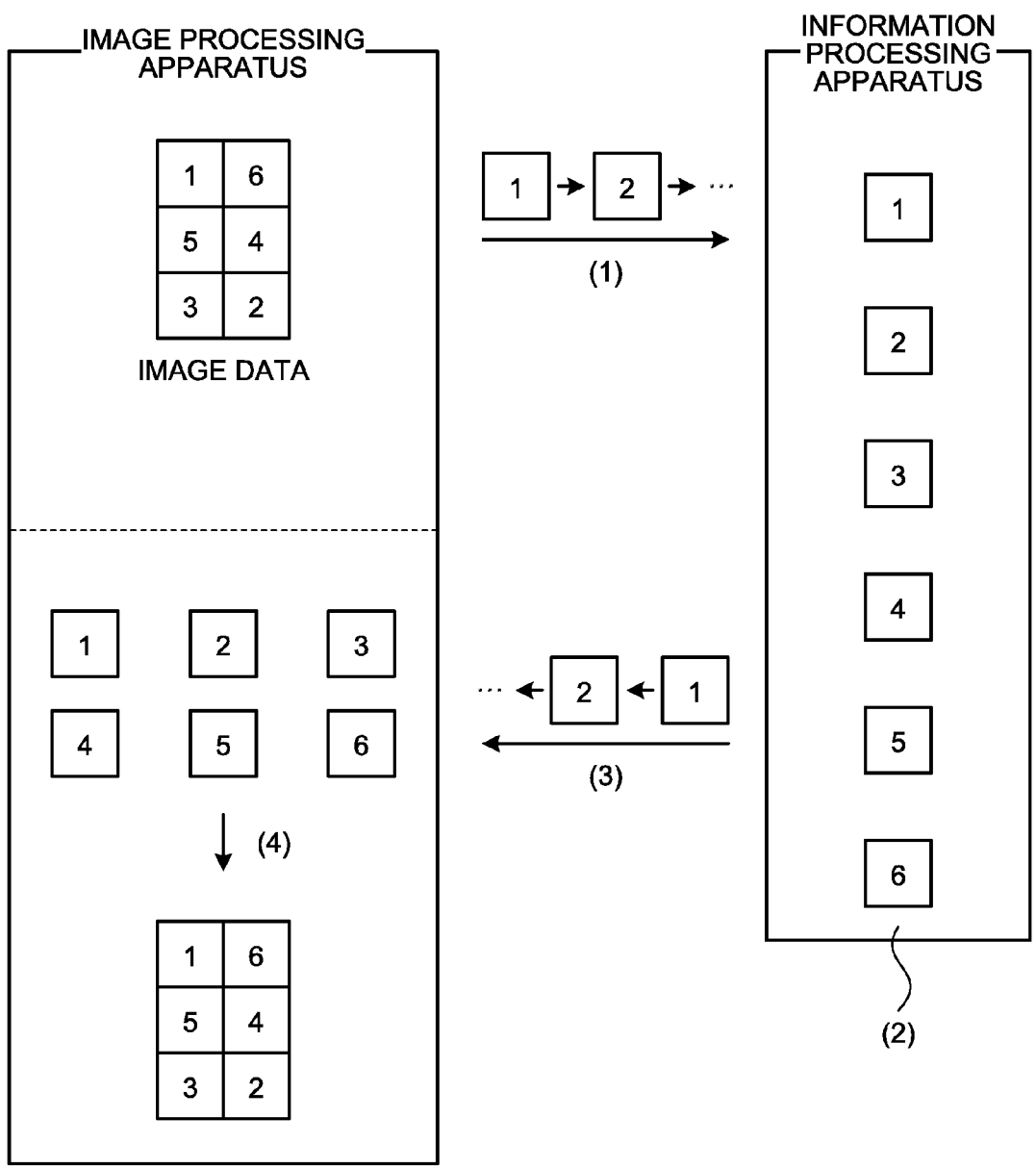
FIG. 13 is a schematic diagram for explaining an example of transferring image data according to the second embodiment.

FIG. 13 is a schematic diagram for explaining an example of transferring image data according to the second embodiment. The image processing apparatus 100 transmits image blocks, which are obtained by dividing image data, to the information processing apparatus 200 in a random order (see (1) in FIG. 13). In the example illustrated in FIG. 13, the order in which the image blocks are transmitted is indicated by numerals. At this time, the image processing apparatus 100 holds the order in which the image blocks are transmitted (the positions of the image blocks in the image data).

The information processing apparatus 200 sequentially performs image processing on the image blocks received from the image processing apparatus 100 (see (2) in FIG. 13). Then, the information processing apparatus 200 returns the image blocks subjected to the image processing to the image processing apparatus 100 (see (3) in FIG. 13). The image processing apparatus 100 generates an image in which the image blocks received from the information processing apparatus 200 are rearranged in the same positions as in the image data before the division (before the transmission) on the basis of the order in which the image blocks are transmitted (see (4) in FIG. 13).

When the image blocks are transmitted from the image processing apparatus 100 to the information processing apparatus 200, it is possible to improve the security by setting the order in which the image blocks are transmitted to an arbitrary order, i.e., a random order. Furthermore, when the image blocks are randomly transmitted from the image processing apparatus 100 to the information processing apparatus 200, and if the image blocks are transferred in the same order to an external apparatus having access authority (for example, the terminal device 300 serving as an administrator PC or the like), the entire image data can hardly be obtained from the image blocks for which the order of transmission has been changed, whereas the terminal device 300 having the access authority can analyze whether appropriate image processing has been performed for each of the image blocks; therefore, it is possible to perform analysis while ensuring the security of the image data. In this case, by sharing the order in which the image blocks are transmitted with the terminal device 300 or the like having the access authority, the external apparatus, such as the terminal device 300, can obtain the entire image data.

Furthermore, as illustrated in FIG. 10, the information processing apparatus 200 includes a reception controller 251, an image processing executor 252, and a transmission controller 253. A part or all of the above-described units may be implemented by software (a program) or may be implemented by a hardware circuit. Furthermore, the image processing executor 252 may have the same image processing function or different image processing functions among a plurality of the information processing apparatuses 200 on a network.

The reception controller 251 controls reception of image data. More specifically, the reception controller 251 receives image data as a target of image processing from the image processing apparatus 100. At this time, the reception controller 251 also receives information on image processing to be performed. The image processing executor 252 executes one or more specified image processing functions that are parts of a function included in a series of image processing on the image data. More specifically, the image processing executor 252 executes one or more specified image processing functions that are parts of a function included in a series of image processing performed by the image processing apparatus 100, in accordance with the information on the image processing to be performed, and applies the image processing to the image data. In this manner, it may be possible to execute a single or plurality of image processing functions. The transmission controller 253 controls transmission of the image data generated through execution of the image processing functions to the image processing apparatus 100. More specifically, the transmission controller 253 transmits, to the image processing apparatus 100, the image data that is generated by execution of the image processing functions by the image processing executor 252.

Image Processing Sequence

Figure 14:
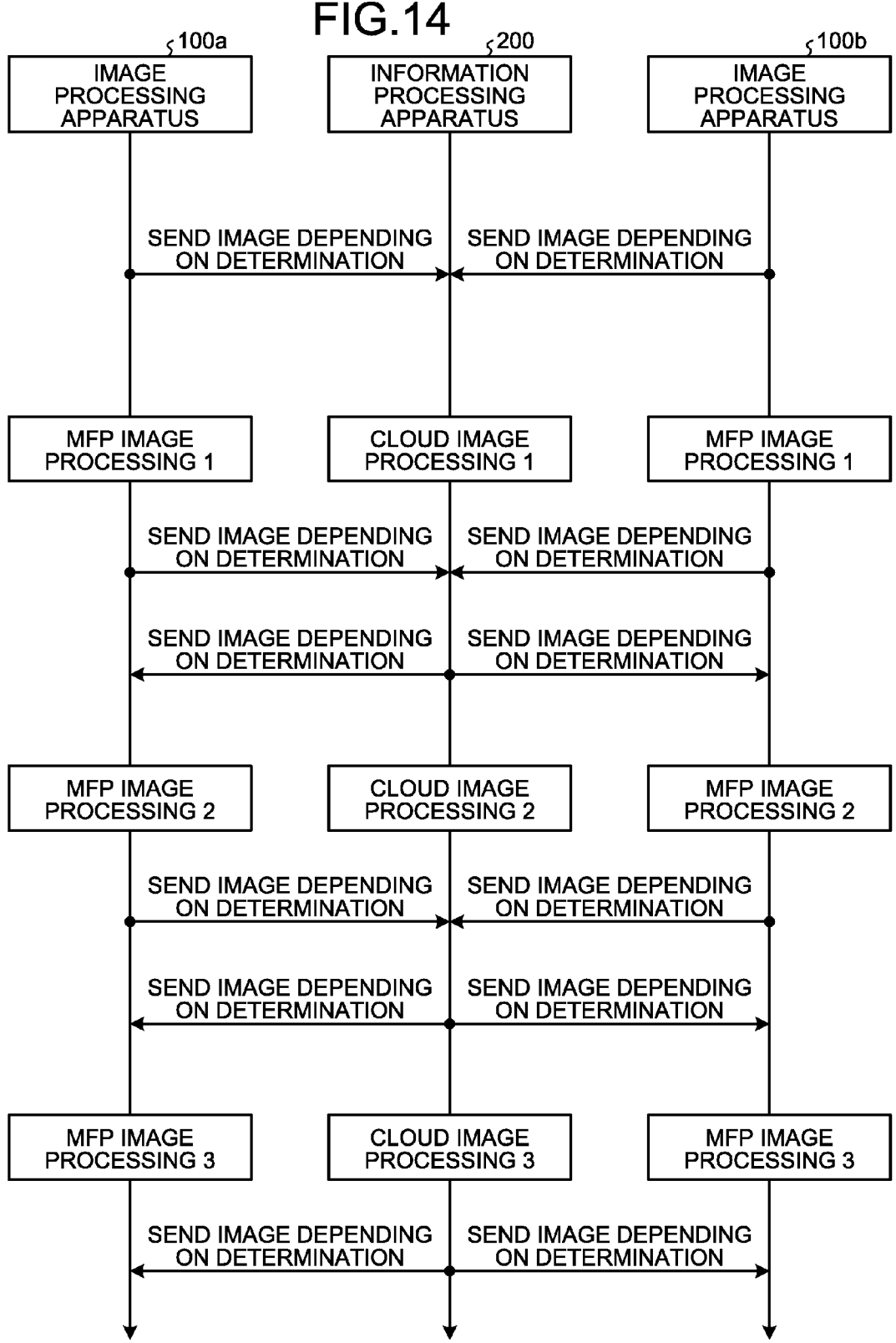
FIG. 14 is a schematic diagram illustrating an example of an image processing sequence among all of apparatuses according to the second embodiment.

Next, with reference to FIG. 14, FIG. 15, and FIG. 16, an image processing sequence according to the second embodiment will be described. FIG. 14 is a schematic diagram illustrating an example of the image processing sequence among all of apparatuses according to the second embodiment.

In FIG. 14, an example is illustrated in which the image processing system 1 includes the image processing apparatus 100a, the image processing apparatus 100b, and the information processing apparatus 200. Furthermore, image processing performed by the image processing apparatus 100a and the image processing apparatus 100b will be referred to as "MFP image processing", and image processing performed by the information processing apparatus 200 will be referred to as "cloud image processing". The image processing apparatus 100a and the image processing apparatus 100b can perform MFP image processing 1, MFP image processing 2, and MFP image processing 3. The information processing apparatus 200 can perform cloud image processing 1, cloud image processing 2, and cloud image processing 3.

In the above-described configuration, the image processing apparatus 100a and the image processing apparatus 100b perform each kind of MFP image processing, and appropriately send image data to the information processing apparatus 200 and cause the information processing apparatus 200 to perform cloud image processing depending on determination. The information processing apparatus 200 performs the cloud image processing on the image data received from the image processing apparatus 100a and the image processing apparatus 100b, and appropriately sends image data to the image processing apparatus 100a and the image processing apparatus 100b depending on determination. In this manner, an apparatus to be caused to perform image processing is determined in accordance with the performance or the condition of the MFP or a type of a series of image processing to be performed (specified image processing), and image data is sent in a synchronized manner.

Figure 15:
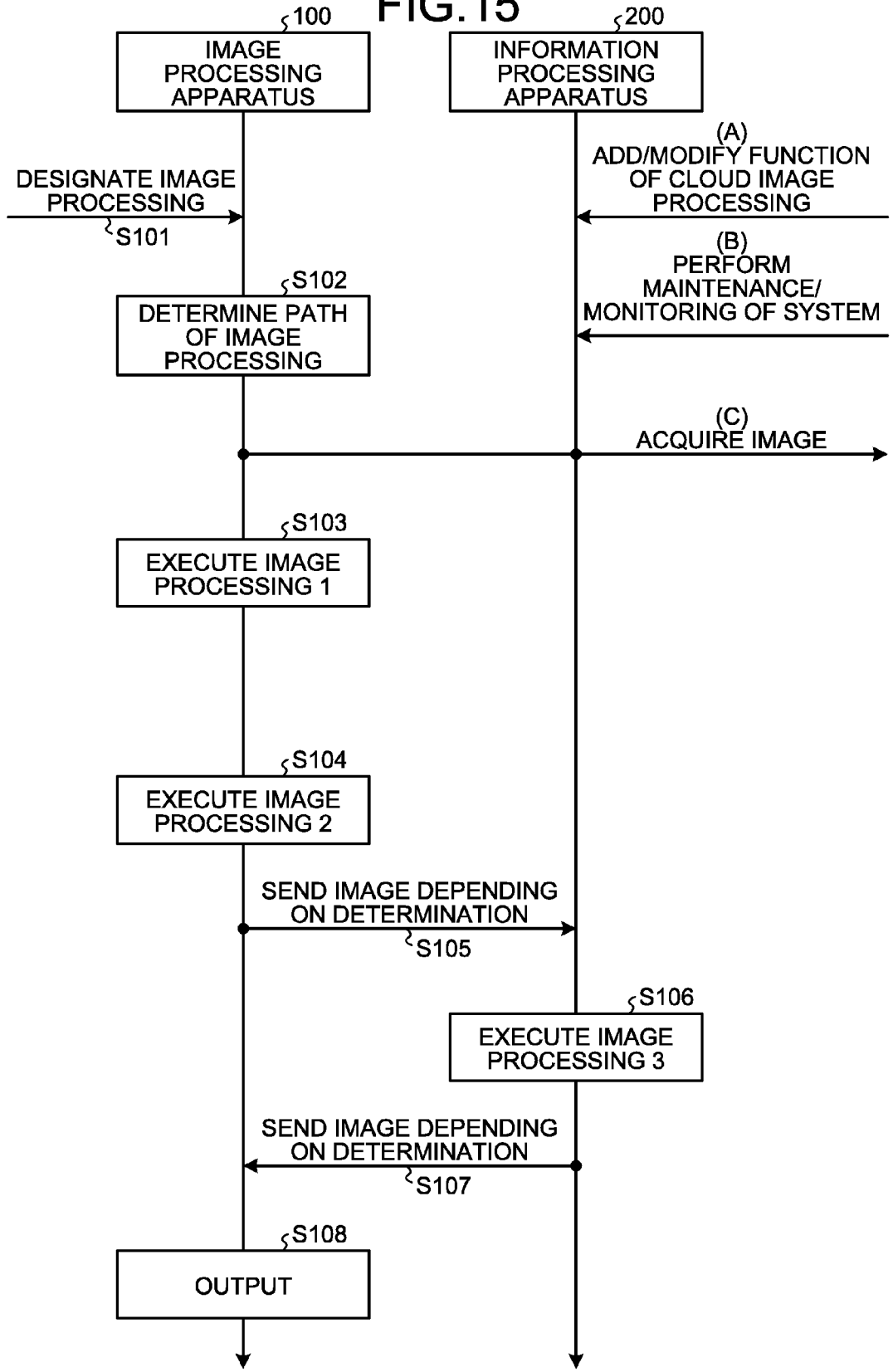
FIG. 15 is a schematic diagram illustrating an example of an image processing sequence according to the second embodiment.

FIG. 15 is a schematic diagram illustrating an example of an image processing sequence according to the second embodiment. In FIG. 15, an example is illustrated in which the information processing apparatus 200 is caused to perform "image processing 3" in a series of image processing including "image processing 1", "image processing 2", and the "image processing 3".

As illustrated in FIG. 15, the image processing apparatus 100 receives designation of image processing (Step S101). Here, an example is described in which image processing for outputting a copy is designated. The image processing apparatus 100 determines a path of the image processing for outputting a copy (Step S102). Here, a path in which the image processing apparatus 100 executes the "image processing 1" and the "image processing 2" and the information processing apparatus 200 executes the "image processing 3" will be described as an example. The image processing apparatus 100 subsequently executes the image processing module "image processing 1" (Step S103). Thereafter, the image processing apparatus 100 executes the image processing module "image processing 2" (Step S104).

Furthermore, to cause the information processing apparatus 200 to perform the "image processing 3", the image processing apparatus 100 transmits the image data subjected to the image processing module "image processing 2" to the information processing apparatus 200 (Step S105). The information processing apparatus 200 executes the image processing module "image processing 3" on the image data received from the image processing apparatus 100 (Step S106). Then, the information processing apparatus 200 transmits the image data subjected to the image processing module "image processing 3" to the image processing apparatus 100 (Step S107). The image processing apparatus 100 outputs a copy by using the image data received from the information processing apparatus 200 (Step S108).

The terminal device 300 included in the image processing system 1 can appropriately add or modify a function of the image processing (the cloud image processing) performed by the information processing apparatus 200 (see (A) in FIG. 15). Furthermore, the terminal device 300 can perform maintenance or monitoring of the image processing system 1 (see (B) in FIG. 15). Moreover, the terminal device 300 can acquire image data subjected to the image processing by the image processing apparatus 100 or the information processing apparatus 200 at an arbitrary timing (see (C) in FIG. 15). In this manner, in the image processing system 1, image processing is sequentially performed on the image data transferred from the image processing apparatus 100 to the information processing apparatus 200, and the image data subjected to the image processing is returned to the image processing apparatus 100. Consequently, in the image processing system 1, it is possible to transfer the image data and perform the image processing in parallel, so that it is possible to improve the processing speed.

Figure 16:
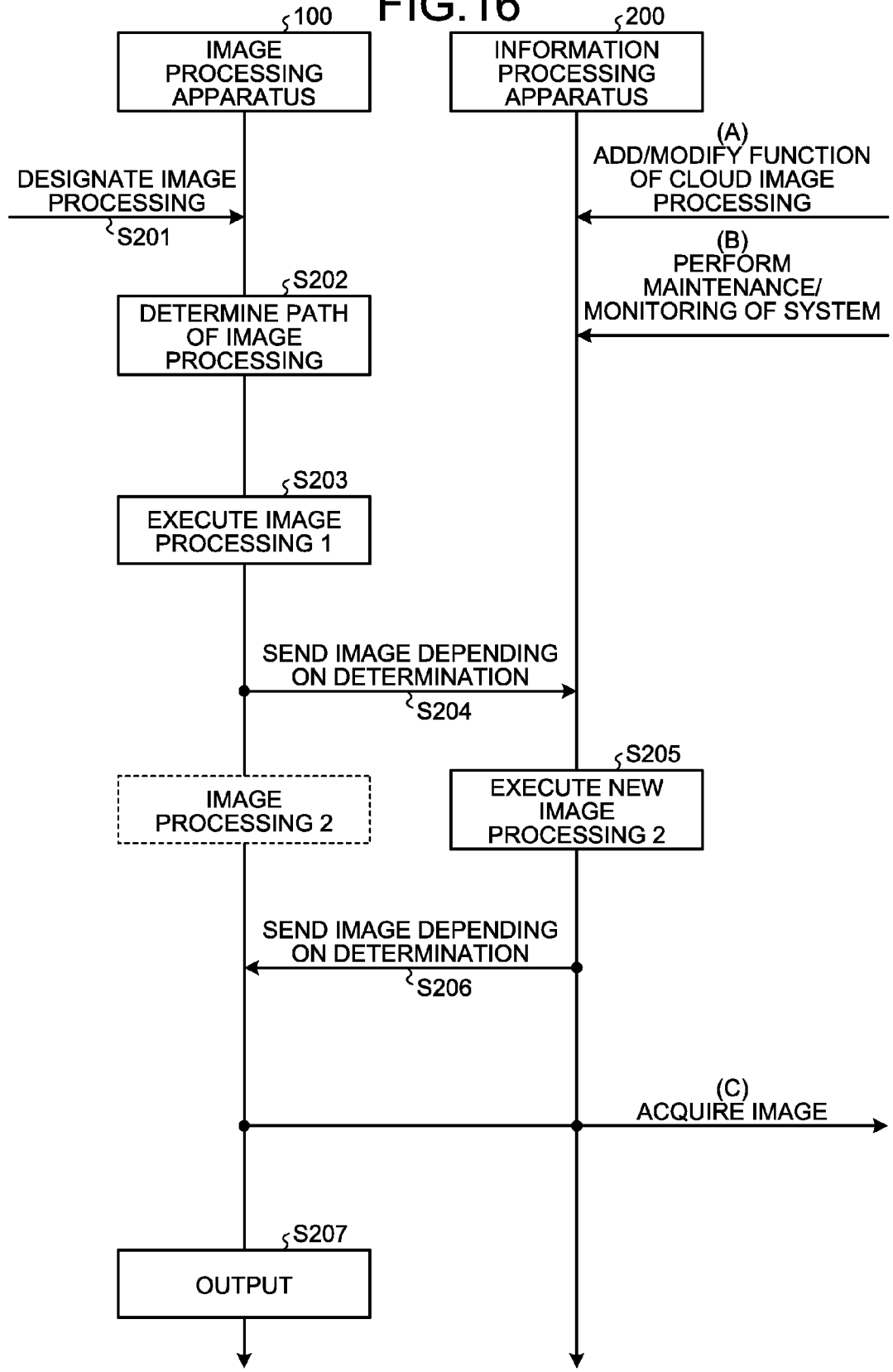
FIG. 16 is a schematic diagram illustrating an example of an image processing sequence according to the second embodiment.

FIG. 16 is a schematic diagram illustrating an example of an image processing sequence according to the second embodiment. In FIG. 16, an example is illustrated in which new image processing "new image processing 2" for "image processing 2" is applied by the information processing apparatus 200 with respect to a series of image processing including "image processing 1" and the "image processing 2".

As illustrated in FIG. 16, the image processing apparatus 100 receives designation of image processing (Step S201). Here, an example is described in which image processing for outputting a copy is designated. The image processing apparatus 100 determines a path of the image processing for outputting a copy (Step S202). Here, a path in which the image processing apparatus 100 executes the "image processing 1" and the information processing apparatus 200 performs the "new image processing 2" will be described as an example. The image processing apparatus 100 subsequently executes the image processing module "image processing 1" (Step S203). Thereafter, to cause the information processing apparatus 200 to perform the "new image processing 2", the image processing apparatus 100 transmits the image data subjected to the image processing module "image processing 1" to the information processing apparatus 200 (Step S204).

The information processing apparatus 200 executes the image processing module "new image processing 2" on the image data received from the image processing apparatus 100 (Step S205). Then, the information processing apparatus 200 transmits the image data subjected to the image processing module "new image processing 2" to the image processing apparatus 100 (Step S206). The image processing apparatus 100 outputs a copy by using the image data received from the information processing apparatus 200 (Step S207).

The terminal device 300 included in the image processing system 1 can appropriately add or modify a function of the image processing (the cloud image processing) performed by the information processing apparatus 200 (see (A) in FIG. 16). Furthermore, the terminal device 300 can perform maintenance or monitoring of the image processing system 1 (see (B) in FIG. 16). Moreover, the terminal device 300 can acquire image data subjected to the image processing by the image processing apparatus 100 or the information processing apparatus 200 at an arbitrary timing (see (C) in FIG. 16). In this manner, in the image processing system 1, it is possible to cause the information processing apparatus 200 to perform image processing while avoiding image processing that can be performed by the image processing apparatus 100. Consequently, in the image processing system 1, it is possible to cause the external apparatus, such as the information processing apparatus 200, to perform image processing in accordance with the function or the condition of the image processing apparatus 100.

The image processing apparatus 100, when transferring image data to the information processing apparatus 200, divides the image data into image blocks and transfers the image blocks in an overlapping manner so that image processing can be performed on all of pixels included in the image blocks; therefore, it is possible to ensure the security of the image data. Furthermore, the image processing apparatus 100 holds image data transferred to the information processing apparatus 200, requests the information processing apparatus 200 to return only a partial image to which the image processing is applied, and integrates the held image data and the partial image; therefore, it is possible to improve a transfer speed of the image data. Moreover, the image processing apparatus 100, when transferring the image blocks to the information processing apparatus 200, transfers the image blocks randomly, i.e., in an arbitrary order; therefore, it is possible to improve the security of the image data.

Third Embodiment

Next, a third embodiment will be described. The same components as those of the above-described first and second embodiments will be denoted by the same symbols, and the same explanation may be omitted. In the above-described second embodiment, an example has been described in which the image blocks are transferred to the information processing apparatus 200 in an overlapping manner, image data to be transferred is held, only a partial image subjected to the image processing is returned from the information processing apparatus 200, the held image data and the partial image are integrated, and the image blocks are transferred to the information processing apparatus 200 randomly, i.e., in an arbitrary order. In the third embodiment, an example will be described in which an image block to be transferred to the information processing apparatus 200 is selected.

Functional Configuration of Image Processing Apparatus

Figure 17:
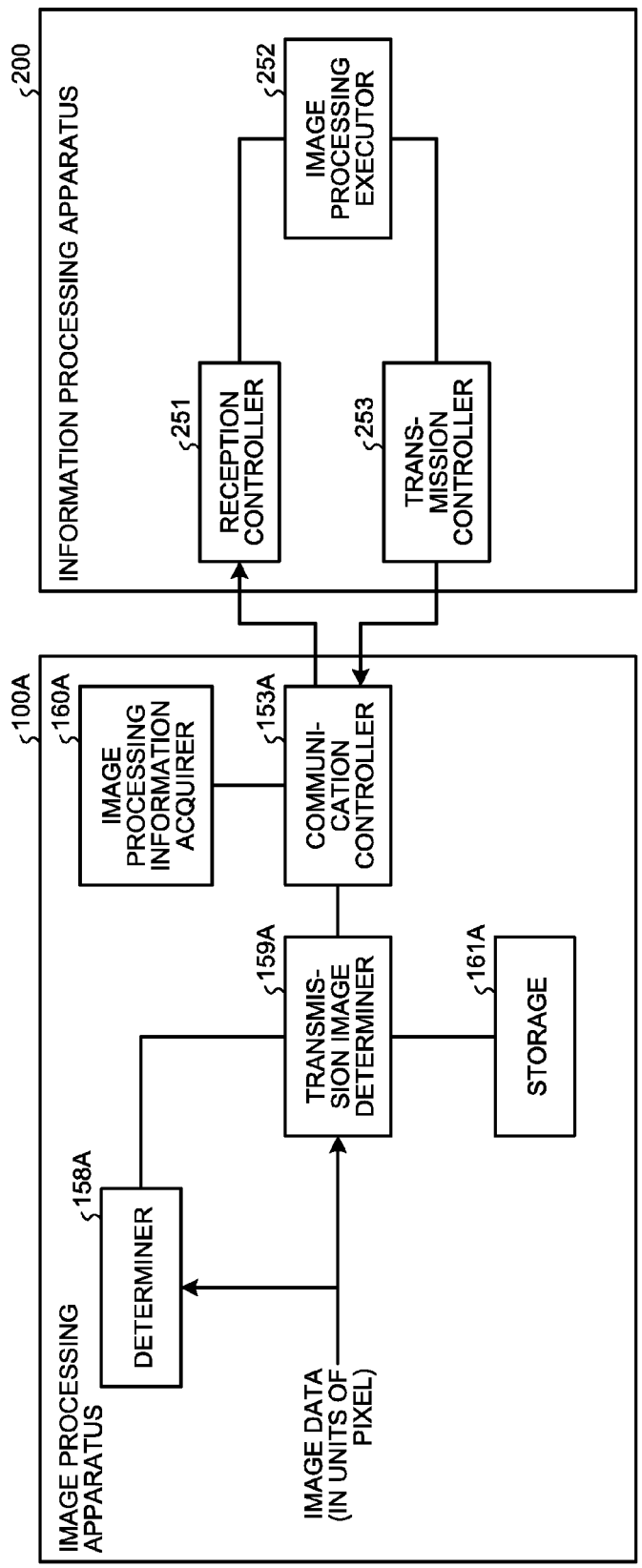
FIG. 17 is a block diagram illustrating a functional configuration example of an image processing apparatus according to a third embodiment.

With reference to FIG. 17, a functional configuration of an image processing apparatus 100A according to the third embodiment will be described. FIG. 17 is a block diagram illustrating a functional configuration example of the image processing apparatus 100A according to the third embodiment. The functional configuration of the information processing apparatus 200 illustrated in FIG. 17 is the same as the information processing apparatus 200 described in the second embodiment, and therefore, detailed explanation thereof may be omitted.

As illustrated in FIG. 17, the image processing apparatus 100A includes a communication controller 153A, a determiner 158A, a transmission image determiner 159A, an image processing information acquirer 160A, and a storage 161A. A part or all of the above-described units other than the storage 161A may be implemented by software (a program) or may be implemented by a hardware circuit. Furthermore, the above-described units other than the storage 161A correspond to functions implemented by the engine CPU 111 or the main-controller CPU 122.

In the third embodiment, as illustrated in FIG. 17, image data in units of a pixel is input to the determiner 158A and the transmission image determiner 159A. In other words, in the example described below, an image block divided by the divider 151 in the above-described second embodiment includes a single pixel.

The determiner 158A determines whether a divided image block is a background or not on the basis of background information on the divided image block. More specifically, the determiner 158A detects background information on the image block (the single pixel) divided by the divider 151. For example, the determiner 158A calculates a pixel value as the background information on the pixel. Then, the determiner 158A compares the pixel value of the image block (the single pixel) with a predetermined threshold on the basis of the detected background information, determines that the image block is a background when the pixel value is equal to or greater than the predetermined threshold, and determines that the image block is not a background when the pixel value is smaller than the predetermined threshold. A determination result obtained by the determiner 158A is output to the transmission image determiner 159A. In an image pattern, the background corresponds to a portion in which toner is not attached and an image is not formed (a non-image portion). In contrast, a portion other than the background corresponds to a portion in which toner is attached and an image is formed (an image portion).

The transmission image determiner 159A determines that an image block that has been determined as not being a background is used as an image block to be transmitted to an external apparatus. More specifically, when the determiner 158A determines that an image block (a single pixel) divided by the divider 151 is not a background, the transmission image determiner 159A determines the image block as an image block to be transmitted to the information processing apparatus 200. Furthermore, when the determiner 158A determines that an image block (a single pixel) divided by the divider 151 is a background, the transmission image determiner 159A stores the image block in the storage 161A.

In other words, the transmission image determiner 159A determines that an image block for which the image processing is needed is to be transmitted to the information processing apparatus 200, and stores an image block for which the image processing is not needed in the storage 161A without transmitting the image block to the information processing apparatus 200. Furthermore, when storing the image block (the single pixel) determined as being a background in the storage 161A, the transmission image determiner 159A also stores positional information on each of the image blocks (including the image block to be transferred to the information processing apparatus 200) in the storage 161A. With this operation, the image block determined as being a background and the positional information on each of the image blocks are stored in the storage 161A.

The image processing information acquirer 160A acquires image processing information in accordance with image processing performed by the subject apparatus. More specifically, the image processing information acquirer 160A acquires image processing information, such as color information, a resolution, or an image quality mode, on an image block, which is obtained through the image processing performed by the image processing apparatus 100A. Then, the image processing information acquirer 160A outputs the acquired image processing information to the communication controller 153A.

The communication controller 153A controls transmission and reception of image data to and from the external apparatus. More specifically, the communication controller 153A transmits the image block (the single pixel) determined by the transmission image determiner 159A and the image processing information acquired by the image processing information acquirer 160A to the information processing apparatus 200. Accordingly, the information processing apparatus 200 performs the image processing on the image data transmitted by the image processing apparatus 100A by using the image processing information, and returns the image data subjected to the image processing to the image processing apparatus 100A. The communication controller 153A receives the image data subjected to the image processing from the information processing apparatus 200. The image processing apparatus 100A that has received the image data subjected to the image processing by the information processing apparatus 200 rearranges the image blocks in the same positions as in the image data before the division on the basis of the image blocks and the positional information on the image blocks that are stored in the storage 161A, and inputs the image data to the image processing module in a subsequent stage.

Flow of Process in Third Embodiment

Figure 18:
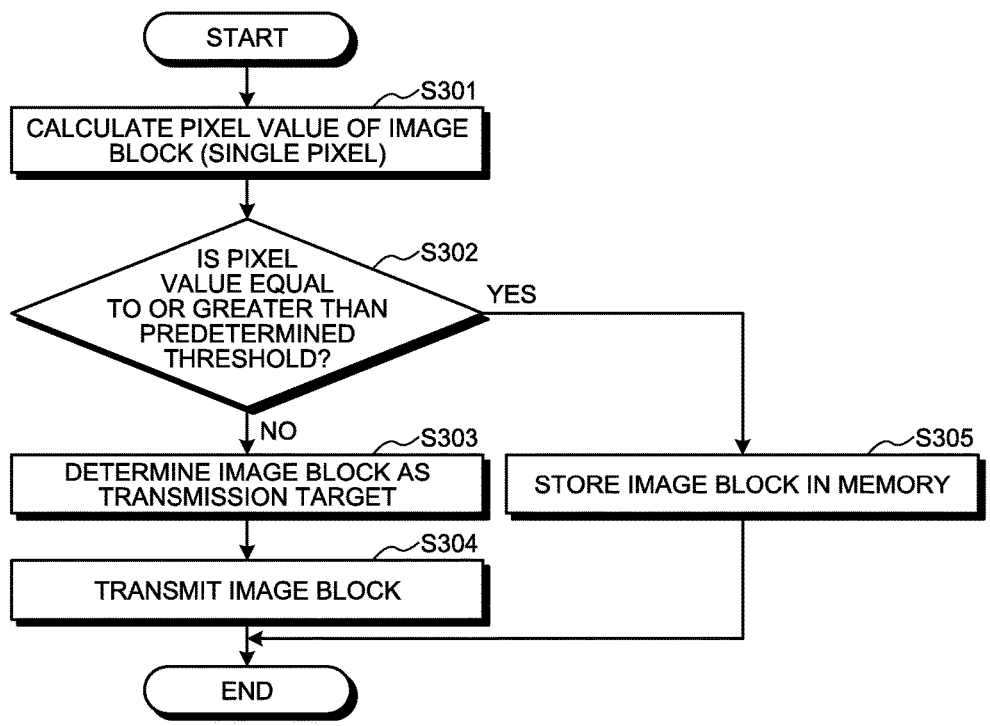
FIG. 18 is a flowchart illustrating an example of the flow of a process according to the third embodiment.

Next, with reference to FIG. 18, the flow of a process according to the third embodiment will be described. FIG. 18 is a flowchart illustrating an example of the flow of the process according to the third embodiment.

As illustrated in FIG. 18, the image processing apparatus 100A calculates a pixel value of an image block (a single pixel) (Step S301). The image processing apparatus 100A determines whether the calculated pixel value of the image block is equal to or greater than a predetermined threshold (Step S302). At this time, when the pixel value of the image block is smaller than the predetermined threshold (NO at Step S302), the image processing apparatus 100A determines the image block (the single pixel) as a transmission target image block to be transmitted to the information processing apparatus 200 (Step S303). Subsequently, the image processing apparatus 100A transmits the image block (the single pixel) determined as the transmission target to the information processing apparatus 200 (Step S304). In contrast, when the pixel value of the image block is equal to or greater than the predetermined threshold (YES at Step S302), the image processing apparatus 100A stores the image block (the single pixel) in the storage 161A (Step S305). The image processing apparatus 100A performs the above-described process on all of the image blocks (the single pixels).

With respect to an image block including a single pixel, the image processing apparatus 100A determines that the image block is not a background when a pixel value is smaller than a predetermined threshold, transmits the image block determined as not being a background to the information processing apparatus 200, and requests image processing. Therefore, the image processing apparatus 100A transfers only a region in which the image processing is needed to the information processing apparatus 200. Consequently, it is possible to control the size of data to be transferred to the information processing apparatus 200 and improve the transfer speed of the entire image data. For example, in the case of a document, such as a text document, in which characters are written on a white paper, a background region is large, so that the effect of the above-described process is increased.

Furthermore, the image processing apparatus 100A transmits, to the information processing apparatus 200, the image processing information on an image block, such as color information, a resolution, or an image quality mode, which is obtained through the image processing performed by the subject apparatus. As a result, the information processing apparatus 200 can perform image processing by using the image processing information including various kinds of information, so that it is possible to obtain an image processing result of higher quality. Moreover, the image processing apparatus 100A transfers, to the information processing apparatus 200, only an image block that is not a background (an image block in which image processing is needed) among the image blocks obtained by dividing image data; therefore, it is possible to further improve the security of the image data.

Fourth Embodiment

Next, a fourth embodiment will be described. The same components as those of the above-described first to third embodiments will be denoted by the same symbols, and the same explanation may be omitted. In the above-described third embodiment, an example has been described in which when the pixel value of a divided image block including a single pixel is smaller than a predetermined threshold, the image block is determined as an image block to be transmitted to the information processing apparatus 200 that performs image processing. In the fourth embodiment, an example will be described in which an image block to be transmitted to the information processing apparatus 200 includes a plurality of pixels.

Functional Configuration of Image Processing Apparatus

Figure 19:
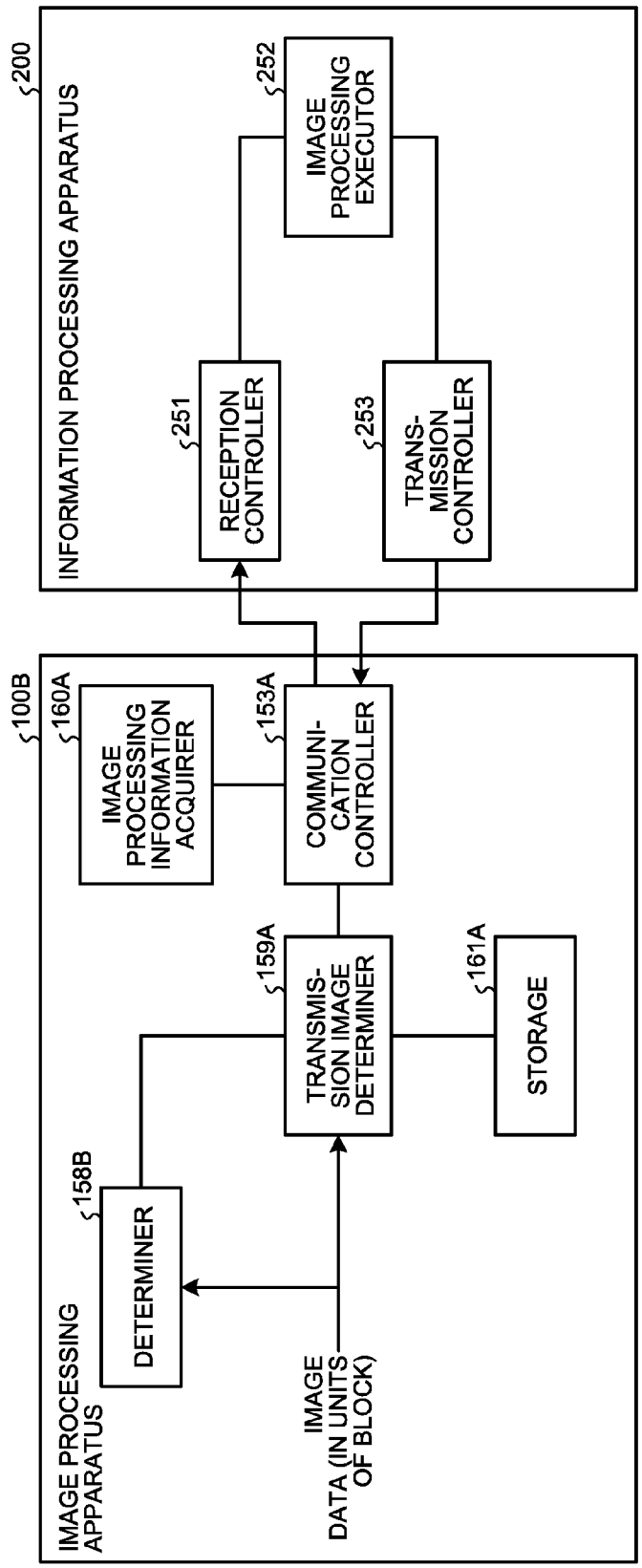
FIG. 19 is a block diagram illustrating a functional configuration example of an image processing apparatus according to a fourth embodiment.

With reference to FIG. 19, a functional configuration of an image processing apparatus 100B according to the fourth embodiment will be described. FIG. 19 is a block diagram illustrating a functional configuration example of the image processing apparatus 100B according to the fourth embodiment. The functional configuration of the information processing apparatus 200 illustrated in FIG. 19 is the same as the information processing apparatus 200 described in the second embodiment, and therefore, detailed explanation thereof may be omitted. In FIG. 19, the same functional components as those of the image processing apparatus 100A according to the third embodiment are denoted by the same symbols, and the same explanation may be omitted.

As illustrated in FIG. 19, the image processing apparatus 100B includes the communication controller 153A, a determiner 158B, the transmission image determiner 159A, the image processing information acquirer 160A, and the storage 161A. A part or all of the above-described units other than the storage 161A may be implemented by software (a program) or may be implemented by a hardware circuit. Furthermore, the above-described units other than the storage 161A correspond to functions implemented by the engine CPU 111 or the main-controller CPU 122.

In the fourth embodiment, as illustrated in FIG. 19, image data including a plurality of pixels is input in units of a block to the determiner 158B and the transmission image determiner 159A. In other words, in the example described below, an image blocks divided by the divider 151 in the above-described second embodiment includes a plurality of pixels.

The determiner 158B determines whether a divided image block is a background or not on the basis of background information on the divided image block. More specifically, the determiner 158B detects background information on the image block (the plurality of pixels) divided by the divider 151. For example, the determiner 158B calculates pixel values as the background information on the pixels. Then, the determiner 158B determines whether a ratio of pixels with the pixel values equal to or greater than a predetermined threshold is equal to or higher than a predetermined ratio in the image block including the plurality of pixels, on the basis of the detected background information.

At this time, when the ratio of the pixels with the pixel values equal to or greater than the predetermined threshold is equal to or higher than the predetermined ratio, the determiner 158B determines that the image block including the plurality of pixels is a background. In contrast, when the ratio of the pixels with the pixel values equal to or greater than the predetermined threshold is lower than the predetermined ratio, the determiner 158B determines that the image block including the plurality of pixels is not a background. In other words, the determiner 158B determines whether the image block is a background or not in accordance with the ratio of the pixels with the pixel values equal to or greater than the predetermined threshold, on the basis of the pixel value of each of the pixels included in the image block. A determination result obtained by the determiner 158B is output to the transmission image determiner 159A.

Furthermore, when an image block includes a plurality of pixels and has a predetermined size, the determiner 158B may perform the determination process as described below. For example, an example will be described in which an image block divided by the divider 151 has a size of 16×16. Specifically, the determiner 158B detects background information on the image block (16×16 pixels) divided by the divider 151. For example, the determiner 158B calculates pixel values as the background information on the pixels. Then, the determiner 158B determines whether the number of pixels with the pixel values equal to or greater than a predetermined threshold is equal to or greater than a predetermined value in the image block including the 16×16 pixels, on the basis of the detected background information.

At this time, when the number of the pixels with the pixel values equal to or greater than the predetermined threshold is equal to or greater than the predetermined value, the determiner 158B determines that the image block including the 16×16 pixels is a background. In contrast, when the number of the pixels with the pixel values equal to or greater than the predetermined threshold is smaller than the predetermined value, the determiner 158B determines that the image block including the 16×16 pixels is not a background. In other words, the determiner 158B determines whether the image block is a background or not in accordance with the number of the pixels with the pixel values equal to or greater than the predetermined threshold, on the basis of the pixel value of each of the pixels included in the image block with a predetermined size. A determination result obtained by the determiner 158B is output to the transmission image determiner 159A.

The transmission image determiner 159A determines that an image block that has been determined as not being a background is used as an image block to be transmitted to an external apparatus. The process performed by the transmission image determiner 159A is the same as the process described in the third embodiment except that the image block including a plurality of pixels is used. That is, when the determiner 158B determines that an image block (a plurality of pixels) divided by the divider 151 is not a background, the transmission image determiner 159A determines the image block as an image block to be transmitted to the information processing apparatus 200. Furthermore, when the determiner 158B determines that an image block (a plurality of pixels) divided by the divider 151 is a background, the transmission image determiner 159A stores the image block in the storage 161A.

The image processing information acquirer 160A acquires image processing information in accordance with image processing performed by the subject apparatus. The process performed by the image processing information acquirer 160A is the same as the process described in the third embodiment. In other words, the image processing information acquirer 160A acquires image processing information, such as color information, a resolution, or an image quality mode, on an image block, which is obtained through the image processing performed by the image processing apparatus 100B, and outputs the acquired image processing information to the communication controller 153A.

The communication controller 153A controls transmission and reception of image data to and from an external apparatus. The process performed by the communication controller 153A is the same as the process described in the third embodiment except that the image block including a plurality of pixels is used. In other words, the communication controller 153A transmits the image block (the plurality of pixels) determined by the transmission image determiner 159A and the image processing information acquired by the image processing information acquirer 160A to the information processing apparatus 200. Accordingly, the information processing apparatus 200 performs the image processing on the image data transmitted by the image processing apparatus 100B by using the image processing information, and returns the image data subjected to the image processing to the image processing apparatus 100B. The communication controller 153A receives the image data subjected to the image processing from the information processing apparatus 200. The image processing apparatus 100B that has received the image data subjected to the image processing by the information processing apparatus 200 rearranges the image blocks in the same positions as in the image data before the division on the basis of the image blocks and the positional information on the image blocks that are stored in the storage 161A, and inputs the image data to the image processing module in a subsequent stage.

Flow of Process in Fourth Embodiment

Figure 20:
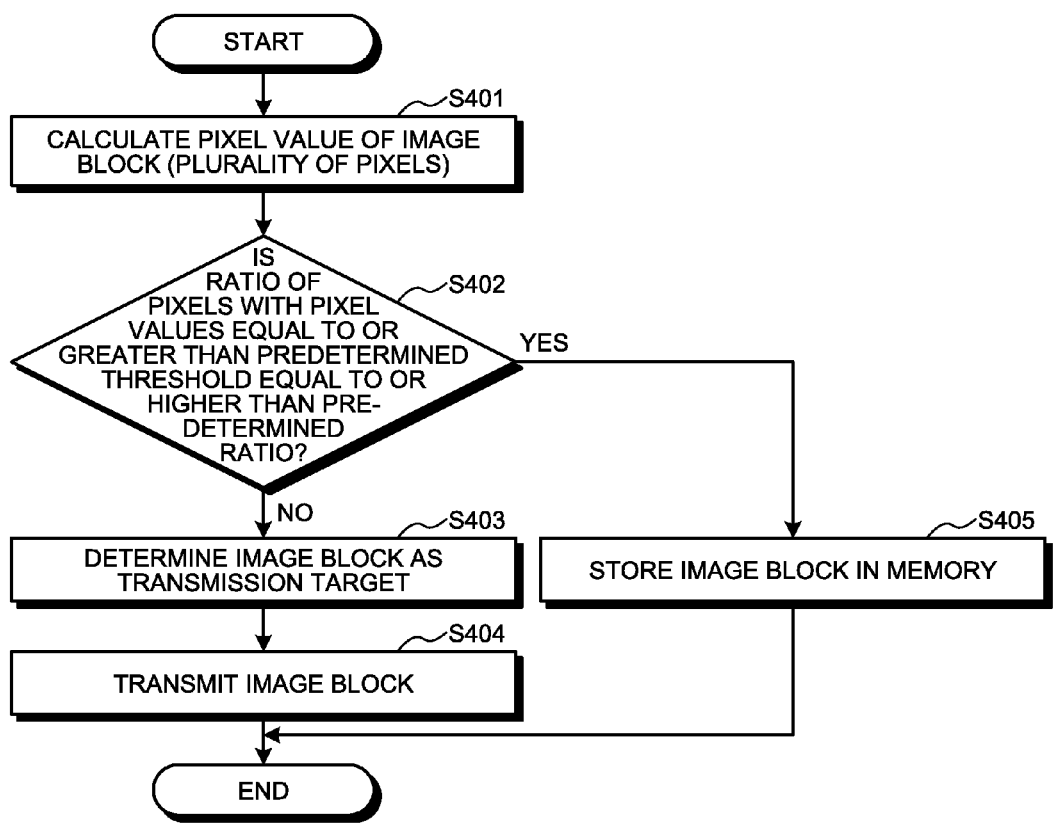
FIG. 20 is a flowchart illustrating an example of the flow of a process according to the fourth embodiment.

Next, with reference to FIG. 20, the flow of a process according to the fourth embodiment will be described. FIG. 20 is a flowchart illustrating an example of the flow of the process according to the fourth embodiment. In FIG. 20, an example will be described in which it is determined whether a ratio of pixels with pixel values equal to or greater than a predetermined threshold is equal to or higher than a predetermined ratio in an image block including a plurality of pixels. In this process, it may be possible to determine whether the number of pixels with pixel values equal to or greater than a predetermined threshold is equal to or greater than a predetermined value as described above.

As illustrated in FIG. 20, the image processing apparatus 100B calculates pixel values of an image block (a plurality of pixels) (Step S401). The image processing apparatus 100B determines whether a ratio of pixels with the calculated pixel values equal to or greater than a predetermined threshold is equal to or higher than a predetermined ratio in the image block (the plurality of pixels) (Step S402). At this time, when the ratio of the pixels with the calculated pixel values equal to or greater than the predetermined threshold is lower than the predetermined ratio (NO at Step S402), the image processing apparatus 100B determines the image block (the plurality of pixels) as a transmission target image block to be transmitted to the information processing apparatus 200 (Step S403). Subsequently, the image processing apparatus 100B transmits the image block (the plurality of pixels) determined as the transmission target to the information processing apparatus 200 (Step S404). In contrast, when the ratio of the pixels with the calculated pixel values equal to or greater than the predetermined threshold is equal to or higher than the predetermined ratio (Step S402: Yes), the image processing apparatus 100B stores the image block (the plurality of pixels) in the storage 161A (Step S405). The image processing apparatus 100B performs the above-described process on all of the image blocks (the plurality of pixels).

With respect to an image block including a plurality of pixels, the image processing apparatus 100B determines that the image block is not a background when a ratio of pixels with pixel values equal to or greater than a predetermined threshold is lower than a predetermined ratio, transmits the image block determined as not being a background to the information processing apparatus 200, and requests image processing. Therefore, the information processing apparatus 200 can handle the image block including the plurality of pixels as a single image, so that the image processing to be performed can be implemented more simply.

Furthermore, with respect to an image block with a predetermined size, the image processing apparatus 100B determines that the image block is not a background when the number of pixels with pixel values equal to or greater than a predetermined threshold is smaller than a predetermined value, transmits the image block determined as not being a background to the information processing apparatus 200, and requests image processing. Therefore, the information processing apparatus 200 can handle the image block with the predetermined size as a single image, so that the image processing to be performed can be implemented more simply. Moreover, the image processing apparatus 100B transfers, to the information processing apparatus 200, only an image block that is not a background (an image block in which image processing is needed) among the image blocks that are obtained by dividing the image data and that include a plurality of pixels; therefore, it is possible to further improve the security of the image data.

Fifth Embodiment

While the embodiments of the image processing apparatus 100 according to the present invention have been described above, the present invention may be embodied in various different forms other than the above-described embodiments. Therefore, different embodiments regarding (1) transfer of an image block, (2) management of an image processing module, (3) a configuration, and (4) a program will be described below.

(1) Transfer of Image Block

In the embodiments described above, an example has been described in which image blocks are sequentially transferred from the image processing apparatus 100 to the information processing apparatus 200, and the information processing apparatus 200 sequentially applies image processing on the received image blocks (for example, see FIG. 13). In this case, it is preferable that the image processing apparatus 100 sequentially transfer the image blocks while preventing the information processing apparatus 200 from holding all of the image blocks.

For example, with reference to FIG. 13, when the image processing apparatus 100 transfers image blocks 1 to 6 included in image data to the information processing apparatus 200, and if the image blocks 1 to 5 are held in the information processing apparatus 200 (if the image processing is being performed), the image processing apparatus 100 suspends transfer of the image block 6 to the information processing apparatus 200. Then, when at least one of the image blocks is returned (e.g., when the image block 1 is returned), the image processing apparatus 100 transfers the image block 6 to the information processing apparatus 200. Furthermore, the information processing apparatus 200 deletes image data that has been returned to the image processing apparatus 100 from the subject apparatus. In other words, restoration of original data (image data) from the image blocks held by the information processing apparatus 200 at a predetermined time is prevented. As a result, it is possible to further improve the security of the image data.

(2) Management of Image Processing Modules

In the embodiments described above, an example has been described in which the image processing apparatus 100 holds the image processing modules. The image processing modules held by the image processing apparatus 100 may be managed by the information processing apparatus 200.

For example, the image processing apparatus 100 provides information on an image processing module held in the subject apparatus to the information processing apparatus 200. The information processing apparatus 200 manages the information on the image processing module received from the image processing apparatus 100. When there is a function to be updated or to be newly added with respect to a function of the managed image processing module, the information processing apparatus 200 provides information on the update or the new addition as update information to the image processing apparatus 100. Accordingly, the image processing apparatus 100 displays the update information by a GUI to notify a user of the update information. When the user determines to perform the update or the new addition on the basis of the update information, the image processing apparatus 100 notifies the information processing apparatus 200 of an image processing module related to the corresponding function. The information processing apparatus 200 updates management information on the image processing module related to the image processing apparatus 100. When executing a new function, the image processing apparatus 100 transfers output data of an image processing module of the corresponding function to the information processing apparatus 200. Accordingly, the information processing apparatus 200 performs image processing of the corresponding function and returns image data subjected to the image processing to the image processing apparatus 100. The image processing apparatus 100 inputs the received image data to a subsequent image processing module of the corresponding function.

(3) Configuration

The processing procedures, control procedures, specific names, and information including various kinds of data and parameters illustrated in the above-described document and drawings may be arbitrarily changed unless otherwise specified. Furthermore, the components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

(4) Program

A program executed by the image processing apparatus 100 may be provided, as one embodiment, by being recorded in a computer-readable recording medium, such as a compact disc-read only memory (CD-ROM), a flexible disk (FD), a compact disc-recordable (CD-R), or a digital versatile disk (DVD), in a computer-installable or a computer-executable file format. Furthermore, the program executed by the image processing apparatus 100 may be provided by being stored in a computer connected to a network, such as the Internet, and downloaded via the network. Moreover, the program executed by the image processing apparatus 100 may be provided or distributed via a network, such as the Internet. Furthermore, the program executed by the image processing apparatus 100 may be provided by being incorporated in a ROM or the like in advance.

The program executed by the image processing apparatus 100 has a module structure including the above-described units (the divider 151, the communication controller 152, the requester 154, the integrated image generator 155, and the rearranged image generator 156). As actual hardware, a CPU reads and executes the program from a storage medium, so that the above-described units are loaded on a main storage device, and the divider 151, the communication controller 152, the requester 154, the integrated image generator 155, and the rearranged image generator 156 are generated on the main storage device.

According to an embodiment of the present invention, it is possible to ensure the security of data transferred via a network.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
a read image processor configured to execute an image processing module corresponding to read of image data;
a write image processor configured to execute an image processing module corresponding to write of image data;
an image path selector configured to select a path for transmitting image data output from the image processing modules corresponding to read and write of image data to an external apparatus, and select a path for inputting image data processed by the external apparatus to an image processing module in a subsequent stage;
a communication controller configured to control transmission and reception of image data to and from the external apparatus; and a divider configured to divide the image data to be transmitted to the external apparatus into image blocks each including an arbitrary number of pixels, wherein the communication controller sequentially transmits the image blocks to the external apparatus.

2. The image processing apparatus according to claim 1, further comprising:
a circuit information acquirer configured to acquire circuit information indicating an image processing function; and
a function extension processor configured to reconfigure a circuit from the acquired circuit information to implement the image processing function, wherein
the image path selector selects a path for inputting image data output from the image processing modules corresponding to read and write of image data to the function extension processor, and selects a path for inputting image data having been processed by the function extension processor to an image processing module in a subsequent stage.

3. The image processing apparatus according to claim 1, further comprising:
a divider configured to divide the image data to be transmitted to the external apparatus into image blocks with a size corresponding to number of neighboring pixels to be referred to in image processing, wherein
the communication controller sequentially transmits the image blocks in an overlapping manner to the external apparatus.

4. The image processing apparatus according to claim 1, further comprising:
a storage configured to hold the image data transmitted to the external apparatus;

a requester configured to request the external apparatus to return a partial image representing a part of an image subjected to the image processing in the image data; and
an integrated image generator configured to generate an image in which the held image data and the partial image returned from the external apparatus are integrated.

5. The image processing apparatus according to claim 3, wherein
the communication controller transmits the image blocks to the external apparatus in an arbitrary order, and receives the image blocks that are processed in the arbitrary order from the external apparatus,
the image processing apparatus further comprises a rearranged image generator configured to generate an image in which the received image blocks are rearranged in same positions as in the image data before the division.

6. The image processing apparatus according to claim 1, wherein
the communication controller transmits the image blocks to the external apparatus in an arbitrary order, and receives the image blocks that are processed in the arbitrary order from the external apparatus,
the image processing apparatus further comprises a rearranged image generator configured to generate an image in which the received image blocks are rearranged in same positions as in the image data before the division.

7. The image processing apparatus according to claim 1, further comprising:
a determiner configured to determine whether the image blocks are a background on the basis of background information on the divided image blocks; and
a transmission image determiner configured to determine an image block that has been determined as not being the background as an image block to be transmitted to the external apparatus, wherein
the communication controller transmits the determined image block to the external apparatus.

8. The image processing apparatus according to claim 7, wherein when each of the image blocks includes a single pixel, the determiner determines that the image block is a background when a pixel value of the image block is equal to or greater than a predetermined value, and determines that the image block is not the background when the pixel value is smaller than the predetermined threshold.

9. The image processing apparatus according to claim 7, wherein when each of the image blocks includes a plurality of pixels, the determiner determines that the image block is a background when a ratio of pixels with pixel values equal to or greater than a predetermined threshold is equal to or higher than a predetermined ratio, and determines that the image block is not the background when the ratio is lower than the predetermined ratio.

10. The image processing apparatus according to claim 7, wherein when each of the image blocks includes a plurality of pixels and has a predetermined size, the determiner determines that the image block is a background when number of pixels with pixel values equal to or greater than a predetermined threshold is equal to or greater than a predetermined value, and determines that the image block is not the background when the number of the pixels is smaller than the predetermined value.

11. The image processing apparatus according to claim 7, further comprising an image processing information acquirer configured to acquire image processing information in accordance with image processing performed by the image processing apparatus, wherein
the communication controller transmits the acquired image processing information to the external apparatus.

12. An image processing method performed by an image processing apparatus, the image processing method comprising:
executing an image processing module corresponding to read of image data;
executing an image processing module corresponding to write of image data;
selecting a path for transmitting image data output from the image processing modules corresponding to read and write of image data to an external apparatus;
selecting a path for inputting image data processed by the external apparatus to an image processing module in a subsequent stage;
controlling transmission and reception of image data to and from the external apparatus; and
dividing the image data to be transmitted to the external apparatus into image blocks each including an arbitrary number of pixels, wherein the image blocks are sequentially transmitted to the external apparatus.

* * * * *